(12) United States Patent
Kim et al.

(10) Patent No.: US 10,042,457 B2
(45) Date of Patent: Aug. 7, 2018

(54) WATCH TYPE TERMINAL

(71) Applicant: LG Electronics Inc., Seoul (KR)

(72) Inventors: Samsick Kim, Seoul (KR); Jongin Lim, Seoul (KR); Sesook Oh, Seoul (KR); Younhwa Choi, Seoul (KR); Shinnyue Kang, Seoul (KR); Yoonseok Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 190 days.

(21) Appl. No.: 14/812,596

(22) Filed: Jul. 29, 2015

(65) Prior Publication Data

US 2016/0239142 A1  Aug. 18, 2016

(30) Foreign Application Priority Data

Feb. 12, 2015  (KR) ........................ 10-2015-0021813

(51) Int. Cl.
 *G04G 21/08* (2010.01)
 *G06F 1/16* (2006.01)
 (Continued)

(52) U.S. Cl.
 CPC ......... *G06F 3/0416* (2013.01); *G04G 13/025* (2013.01); *G04G 21/025* (2013.01); *G04G 21/04* (2013.01); *G04G 21/08* (2013.01); *G06F 1/163* (2013.01); *G06F 1/1637* (2013.01); *G06F 1/1692* (2013.01); *G06F 3/0412* (2013.01); *G06F 3/0485* (2013.01); *G06F 3/0488* (2013.01); *G06F 3/04817* (2013.01); *G06F 3/04883* (2013.01); *G06F 3/04886* (2013.01);
 (Continued)

(58) Field of Classification Search
 CPC ........................................ G06F 3/048–3/04897
 See application file for complete search history.

(56) References Cited

U.S. PATENT DOCUMENTS 7,158,123 B2 * 1/2007 Myers .................. G06F 3/0421
345/173
2006/0238517 A1 * 10/2006 King ..................... G06F 1/1626
345/173

(Continued)

FOREIGN PATENT DOCUMENTS

EP  2 733 581 A2  5/2014
EP  2 824 536 A1  1/2015

*Primary Examiner* — Amr Awad
*Assistant Examiner* — Stephen Bray
(74) *Attorney, Agent, or Firm* — Birch, Stewart, Kolasch & Birch, LLP

(57) ABSTRACT

A watch-type terminal including a touch screen configured to display screen information; a bezel portion surrounding a periphery of the touch screen and configured to receive a touch input; and a controller configured to display an image object indicating a status associated with the displayed screen information in one region of the touch screen in response to a first touch input received at a first part of the bezel portion, apply a first function to the screen information in response to a second touch input received at a second part of the bezel portion while the first touch input is maintained at the first part of the bezel portion, and apply a second function different from the first function to the screen information in response to a touch area corresponding to the first touch input being changed.

19 Claims, 25 Drawing Sheets

(51) Int. Cl.
    *G06F 3/0481* (2013.01)
    *G06F 3/0485* (2013.01)
    *G06F 3/0488* (2013.01)
    *G06F 3/041* (2006.01)
    *G04G 13/02* (2006.01)
    *G04G 21/02* (2010.01)
    *G04G 21/04* (2013.01)

(52) U.S. Cl.
    CPC .............. *G06F 2203/04104* (2013.01); *G06F 2203/04803* (2013.01); *G06F 2203/04808* (2013.01)

(56) References Cited

U.S. PATENT DOCUMENTS

| | | | |
|---|---|---|---|
| 2010/0287470 A1 | 11/2010 | Homma et al. | |
| 2011/0157046 A1* | 6/2011 | Lee | G04G 21/08 345/173 |
| 2013/0176250 A1* | 7/2013 | Lee | G06F 3/013 345/173 |
| 2013/0212535 A1* | 8/2013 | Kim | G06F 3/0482 715/841 |
| 2014/0019910 A1* | 1/2014 | Kim | G06F 3/04817 715/810 |
| 2014/0074426 A1* | 3/2014 | Hotelling | G06F 3/0485 702/150 |
| 2016/0231772 A1* | 8/2016 | Huang | G06F 1/163 |

* cited by examiner

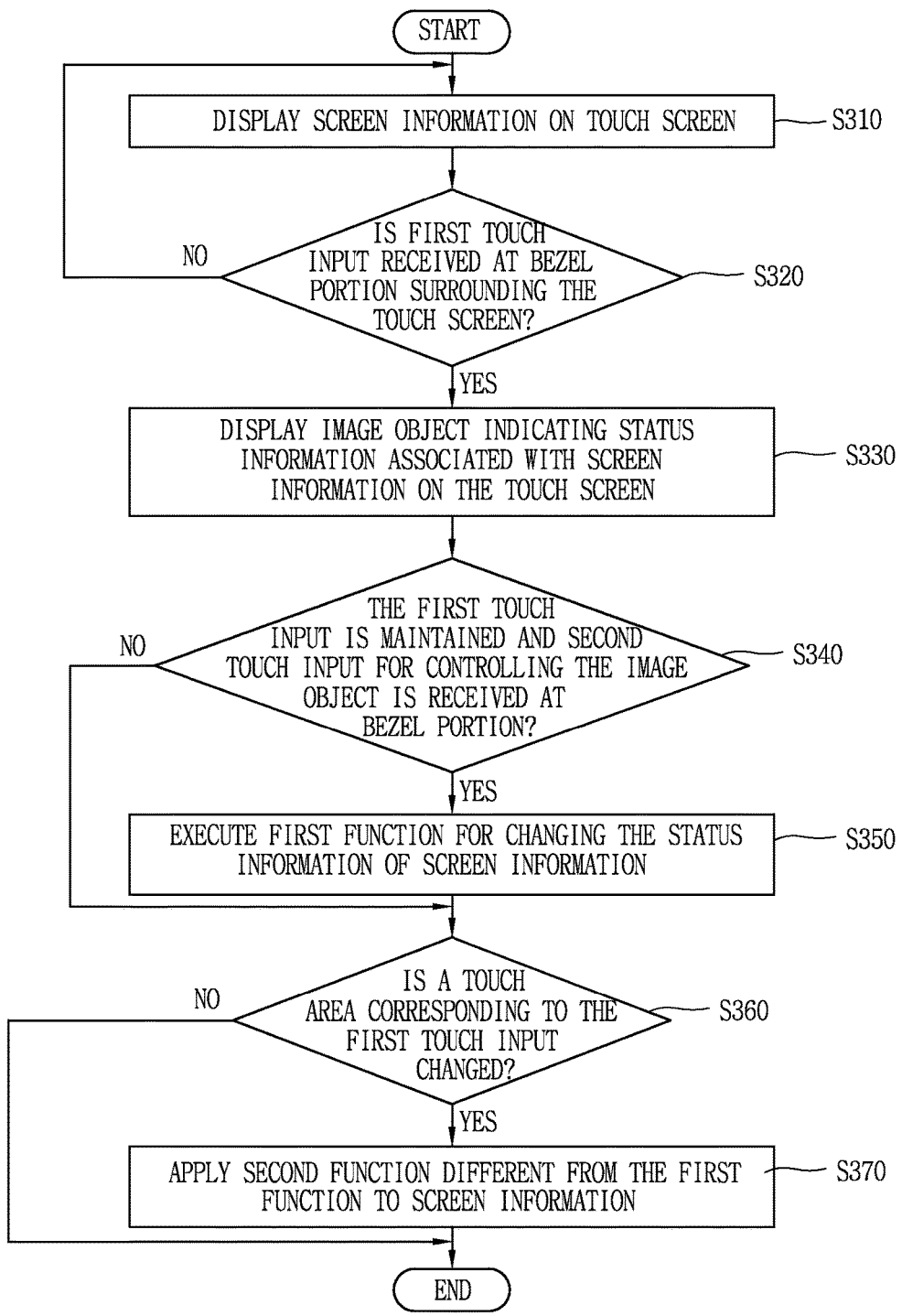

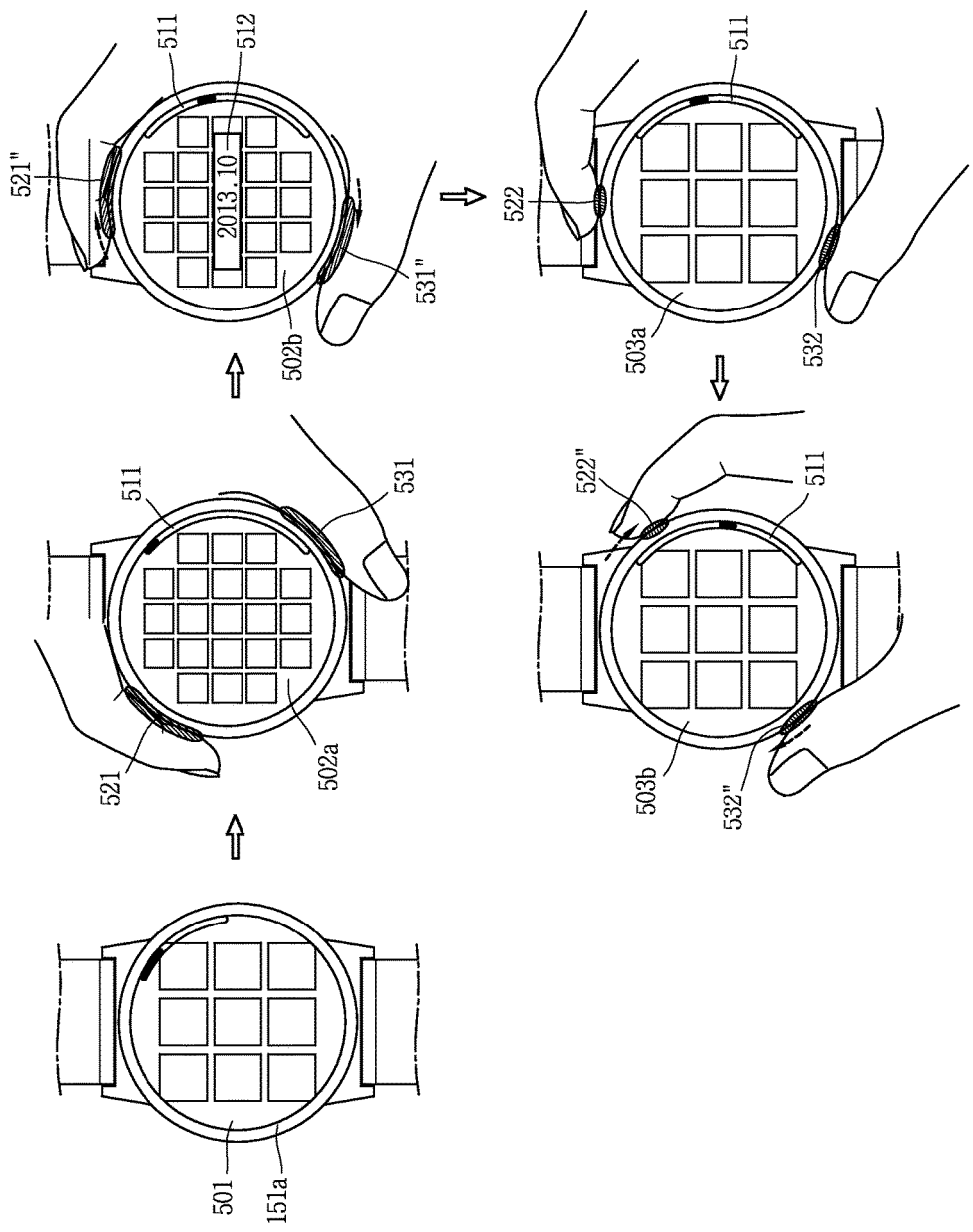

WATCH TYPE TERMINAL

CROSS-REFERENCE TO RELATED APPLICATIONS

This application claims priority to Korean Patent Application No. 10-2015-0021813 filed on Feb. 12, 2015 in Korea, the entire contents of which is hereby incorporated by reference in its entirety.

BACKGROUND OF THE DISCLOSURE

1. Field of the Disclosure

The present disclosure relates to a watch-type terminal that can receive a touch input on a bezel portion surrounding a periphery of a display unit, and a control method thereof.

2. Background of the Disclosure

Terminals may be divided into mobile/portable terminals and stationary terminals. Also, the mobile terminals may be classified into handheld terminals and vehicle mount terminals. As it becomes multifunctional, a mobile terminal can capture still images or moving images, play music or video files, play games, receive broadcast and the like, so as to be implemented as an integrated multimedia player.

In recent years, watch-type terminals have been provided. However, such a watch-type terminal has a small-sized display. Consequently, the user interfaces of operating the watch-type terminal are limited and often cumbersome for the user.

SUMMARY OF THE DISCLOSURE

Accordingly, one object of the present disclosure is to provide a watch-type terminal receiving a touch input to a bezel ring surrounding the periphery of a display and thus displaying a screen on the display without minimizing the screen.

Another object of the present disclosure is to provide a watch-type terminal capable of entering a different control command by varying a touch area applied to the bezel ring or applying touch inputs in parallel to the bezel ring and display.

To achieve these and other advantages and in accordance with the purpose of the present invention, as embodied and broadly described herein, the present invention provides in one aspect a watch-type terminal including a touch screen configured to display screen information; a bezel portion surrounding a periphery of the touch screen and configured to receive a touch input; and a controller configured to display an image object indicating a status associated with the displayed screen information in one region of the touch screen in response to a first touch input received at a first part of the bezel portion, apply a first function to the screen information in response to a second touch input received at a second part of the bezel portion while the first touch input is maintained at the first part of the bezel portion, and apply a second function different from the first function to the screen information in response to a touch area corresponding to the first touch input being changed. The present invention also provides a corresponding method of controlling a mobile terminal.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings, which are given by illustration only, and thus are not limitative of the present invention, and wherein:

FIG. 3 is a flow chart illustrating a method of controlling the screen using a touch input to the bezel portion in a watch-type terminal according to an embodiment of the present disclosure;

FIGS. 5A and 5B are conceptual views illustrating a method of scrolling the screen according to a touch area applied to the bezel portion in a watch-type terminal according to an embodiment of the present disclosure;

DETAILED DESCRIPTION OF THE PREFERRED EMBODIMENTS

Description will now be given in detail according to the embodiments disclosed herein, with reference to the accompanying drawings. For the sake of brief description with reference to the drawings, the same or equivalent components will be provided with the same reference numbers, and description thereof will not be repeated. A suffix "module" and "unit" used for constituent elements disclosed in the following description is merely intended for easy description of the specification, and the suffix itself does not give any special meaning or function.

The accompanying drawings are used to help easily understand the technical idea of the present disclosure and the idea of the present disclosure is not limited by the accompanying drawings. The idea of the present disclosure should be construed to extend to any alterations, equivalents and substitutes besides the accompanying drawings.

Although the terms first, second, etc. may be used herein to describe various elements, these elements should not be limited by these terms. These terms are only used to distinguish one element from another. When an element is referred to as being "connected with" another element, the element can be directly connected with the other element or intervening elements may also be present. In contrast, when an element is referred to as being "directly connected with" another element, there are no intervening elements present.

A singular representation may include a plural representation as far as it represents a definitely different meaning from the context. Terms 'include' or 'has' used herein should be understood that they are intended to indicate an existence of several components or several steps, disclosed in the specification, and it may also be understood that part of the components or steps may not be included or additional components or steps may further be included.

Figure 1A:
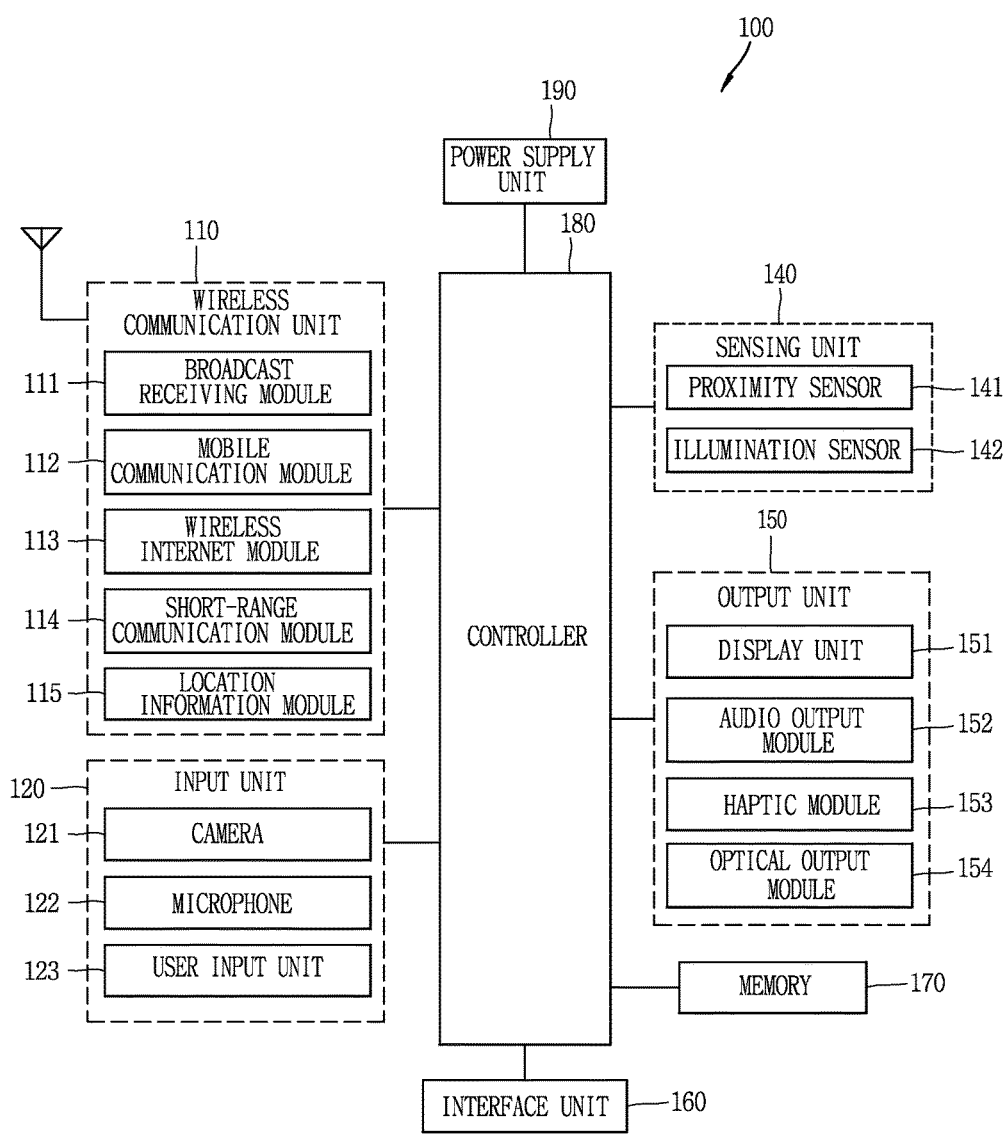
FIG. 1A is a block diagram illustrating a watch-type terminal according to an embodiment of the present disclosure.

FIG. 1A is a block diagram illustrating a watch-type terminal 100 according to an embodiment of the present disclosure in more detail. The watch-type terminal 100 may include components, such as a wireless communication unit 110, an input unit 120, a sensing unit 140, an output unit 150, an interface unit 160, a memory 170, a controller 180, a power supply unit 190 and the like. FIG. 1A illustrates the watch-type terminal having various components, but implementing all of the illustrated components is not a requirement. Greater or fewer components may alternatively be implemented.

In more detail, the wireless communication unit 110 of those components may typically include one or more modules which permit wireless communications between the watch-type terminal 100 and a wireless communication system, between the watch-type terminal 100 and another watch-type terminal 100, or between the watch-type terminal 100 and a network within which another watch-type terminal 100 (or an external server) is located.

For example, the wireless communication unit 110 may include at least one of a broadcast receiving module 111, a mobile communication module 112, a wireless Internet module 113, a short-range communication module 114, a location information module 115 and the like. The input unit 120 may include a camera 121 for inputting an image signal, a microphone 122 or an audio input module for inputting an audio signal, or a user input unit 123 (for example, a touch key, a push key (or a mechanical key), etc.) for allowing a user to input information. Audio data or image data collected by the input unit 120 may be analyzed and processed by a user's control command.

The sensing unit 140 may include at least one sensor which senses at least one of internal information of the watch-type terminal, a surrounding environment of the watch-type terminal and user information. For example, the sensing unit 140 may include a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, refer to the camera 121), a microphone 122, a battery gage, an environment sensor (for example, a barometer, a hygrometer, a thermometer, a radiation detection sensor, a thermal sensor, a gas sensor, etc.), and a chemical sensor (for example, an electronic nose, a health care sensor, a biometric sensor, etc.). Further, the watch-type terminal disclosed herein may utilize information in such a manner of combining information sensed by at least two sensors of those sensors.

The output unit 150 may be configured to output an audio signal, a video signal or a tactile signal. The output unit 150 may include a display unit 151, an audio output module 152, a haptic module 153, an optical output module 154 and the like. The display unit 151 may have an inter-layered structure or an integrated structure with a touch sensor so as to implement a touch screen. The touch screen may provide an output interface between the watch-type terminal 100 and a user, as well as functioning as the user input unit 123 which provides an input interface between the watch-type terminal 100 and the user.

The interface unit 160 may serve as an interface with various types of external devices connected with the watch-type terminal 100. The interface unit 160, for example, may include wired or wireless headset ports, external power supply ports, wired or wireless data ports, memory card ports, ports for connecting a device having an identification module, audio input/output (I/O) ports, video I/O ports, earphone ports, or the like. The watch-type terminal 100 may execute an appropriate control associated with a connected external device, in response to the external device being connected to the interface unit 160.

The memory 170 may store a plurality of application programs (or applications) executed in the watch-type terminal 100, data for operations of the watch-type terminal 100, instruction words, and the like. At least some of those application programs may be downloaded from an external server via wireless communication. Some others of those application programs may be installed within the watch-type terminal 100 at the time of being shipped for basic functions of the watch-type terminal 100 (for example, receiving a call, placing a call, receiving a message, sending a message, etc.). Further, the application programs may be stored in the memory 170, installed in the watch-type terminal 100, and executed by the controller 180 to perform an operation (or a function) of the watch-type terminal 100.

The controller 180 can typically control an overall operation of the watch-type terminal 100 in addition to the operations associated with the application programs. The controller 180 can provide or process information or functions appropriate for a user by processing signals, data, information and the like, which are input or output by the aforementioned components, or activating the application programs stored in the memory 170.

The controller 180 can control at least part of the components illustrated in FIG. 1A, in order to drive the application programs stored in the memory 170. In addition, the controller 180 can drive the application programs by combining at least two of the components included in the watch-type terminal 100 for operation.

The power supply unit 190 may receive external power or internal power and supply appropriate power required for operating respective elements and components included in the watch-type terminal 100 under the control of the controller 180. The power supply unit 190 may include a battery, and the battery may be an embedded battery or a replaceable battery.

At least part of those elements and components may be combined to implement operation and control of the watch-type terminal or a control method of the watch-type terminal according to various embodiments described herein. Also, the operation and control or the control method of the watch-type terminal may be implemented in the watch-type terminal in such a manner of activating at least one application program stored in the memory 170.

Hereinafter, each aforementioned component will be described in more detail with reference to FIG. 1A, prior to explaining various embodiments implemented by the watch-type terminal 100 having the configuration. First, the wireless communication unit 110 will be described. The broadcast receiving module 111 of the wireless communication unit 110 may receive a broadcast signal and/or broadcast associated information from an external broadcast managing entity via a broadcast channel. The broadcast channel may include a satellite channel and a terrestrial channel. At least two broadcast receiving modules 111 may be provided in the watch-type terminal 100 to simultaneously receive at least two broadcast channels or switch the broadcast channels.

The mobile communication module 112 may transmit/receive wireless signals to/from at least one of network entities, for example, a base station, an external watch-type terminal, a server, and the like, on a mobile communication network, which is constructed according to technical standards or transmission methods for mobile communications (for example, Global System for Mobile Communication (GSM), Code Division Multi Access (CDMA), Wideband CDMA (WCDMA), High Speed Downlink Packet access (HSDPA), Long Term Evolution (LTE), etc.). Here, the wireless signals may include audio call signal, video (telephony) call signal, or various formats of data according to transmission/reception of text/multimedia messages.

The wireless Internet module 113 denotes a module for wireless Internet access. This module may be internally or externally coupled to the watch-type terminal 100. The wireless Internet module 113 may transmit/receive wireless signals via communication networks according to wireless Internet technologies. Examples of such wireless Internet access may include Wireless LAN (WLAN), Wireless Fidelity (Wi-Fi) Direct, Digital Living Network Alliance (DLNA), Wireless Broadband (Wibro), Worldwide Interoperability for Microwave Access (Wimax), High Speed Downlink Packet Access (HSDPA), Long Term Evolution (LTE), Long Term Evolution-Advanced (LTE-A) and the like. The wireless Internet module 113 may transmit/receive data according to at least one wireless Internet technology within a range including even Internet technologies which are not aforementioned.

From the perspective that the wireless Internet accesses according to Wibro, HSDPA, GSM, CDMA, WCDMA, LTE, LTE-A and the like are executed via a mobile communication network, the wireless Internet module 113 which performs the wireless Internet access via the mobile communication network may be understood as a type of the mobile communication module 112.

The short-range communication module 114 denotes a module for short-range communications. Suitable technologies for implementing the short-range communications may include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless Universal Serial Bus (Wireless USB) and the like. The short-range communication module 114 may support wireless communications between the watch-type terminal 100 and a wireless communication system, between the watch-type terminal 100 and another watch-type terminal 100, or between the watch-type terminal and a network where another watch-type terminal 100 (or an external server) is located, via wireless personal area networks. The short-range wireless communication network may be a short-range wireless personal area network.

The location information module 115 denotes a module for detecting or calculating a position of the watch-type terminal. An example of the location information module 115 may include a Global Position System (GPS) module or a Wi-Fi module. For example, when the watch-type terminal uses the GPS module, a position of the watch-type terminal may be acquired using a signal sent from a GPS satellite. As another example, when the watch-type terminal uses the Wi-Fi module, a position of the watch-type terminal may be acquired based on information related to a wireless access point (AP) which transmits or receives a wireless signal to or from the Wi-Fi module. According to the need, the location information module 115 may perform any function of the other modules of the wireless communication unit 110 to obtain data on the location of the watch-type terminal. As a module used to acquire the location (or current location) of the watch-type terminal, the location information module 115 may not be necessarily limited to a module for directly calculating or acquiring the location of the watch-type terminal.

Hereinafter, the input unit 120 will be described in more detail. The input unit 120 may be configured to provide an audio or video signal (or information) input to the watch-type terminal or information input by a user to the watch-type terminal. For the input of the audio information, the watch-type terminal 100 may include one or a plurality of cameras 121. The camera 121 may process image frames of still pictures or video obtained by image sensors in a video call mode or a capture mode. The processed image frames may be displayed on the display unit 151. Further, the plurality of cameras 121 disposed in the watch-type terminal 100 may be arranged in a matrix configuration. By use of the cameras 121 having the matrix configuration, a plurality of image information having various angles or focal points may be input into the watch-type terminal 100. Also, the plurality of cameras 121 may be arranged in a stereoscopic structure to acquire a left image and a right image for implementing a stereoscopic image.

The microphone 122 may process an external audio signal into electric audio data. The processed audio data may be utilized in various manners according to a function being executed in the watch-type terminal 100 (or an application program being executed). Further, the microphone 122 may include assorted noise removing algorithms to remove noise generated in the course of receiving the external audio signal.

The user input unit 123 may receive information input by a user. When information is input through the user input unit 123, the controller 180 can control an operation of the watch-type terminal 100 to correspond to the input information. The user input unit 123 may include a mechanical input element (or a mechanical key, for example, a button located on a front/rear surface or a side surface of the watch-type terminal 100, a dome switch, a jog wheel, a jog switch, etc.), and a touch-sensitive input mechanism. As one example, the touch-sensitive input mechanism may be a virtual key, a soft key or a visual key, which is displayed on a touch screen through software processing, or a touch key which is disposed on a portion except for the touch screen. Further, the virtual key or the visual key may be displayable on the touch screen in various shapes, for example, graphic, text, icon, video or a combination thereof.

The sensing unit 140 may sense at least one of internal information of the watch-type terminal, surrounding environment information of the watch-type terminal and user information, and generate a sensing signal corresponding to it. The controller 180 can control an operation of the watch-type terminal 100 or execute data processing, a function or an operation associated with an application program installed in the watch-type terminal based on the sensing signal. Hereinafter, description will be given in more detail of representative sensors of various sensors which may be included in the sensing unit 140.

First, the proximity sensor 141 refers to a sensor to sense presence or absence of an object approaching to a surface to be sensed, or an object disposed near a surface to be sensed, by using an electromagnetic field or infrared rays without a mechanical contact. The proximity sensor 141 may be arranged at an inner region of the watch-type terminal covered by the touch screen, or near the touch screen.

The proximity sensor 141, for example, may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, the proximity sensor 141 may sense proximity of a pointer to the touch screen by changes of an electromagnetic field, which is responsive to an approach of an object with conductivity. In this instance, the touch screen (touch sensor) may be categorized into a proximity sensor.

Furthermore, the illumination sensor 142 refers to a sensor for detecting an amount of light or a changing amount of light to a predetermined detection surface. The illumination sensor 142 may be disposed at an inside region of the watch-type terminal 100 surrounded by the touch screen or adjacent to the touch screen. The amount of light or changing amount of light detected by the illumination sensor 142 may be transferred to the controller 180 to perform the corresponding control operation or function.

Furthermore, as a sensor for sensing the movement of an object using a gyroscope, the gyro sensor 143 may further include an inertial sensor and an acceleration sensor. The gyroscope may include a mechanical gyroscope, a ring gyroscope, an optical fiber gyroscope, and the like. The gyro sensor 143 may sense an inclination corresponding to the movement of the body of the watch-type terminal 100. Specifically, when an upward, downward or horizontal movement is sensed on the watch-type terminal 100, the gyro sensor 143 generates a signal corresponding to the movement to provide it to the controller 180. Then, the controller 180 can detect information associated with the movement such as a direction, a degree, a speed, and a current location or the like at which the watch-type terminal 100 is rotated based on X, Y and Z axes from the provided signal. Then, the controller 180 can track the movement of the watch-type terminal 100 through information associated with the detected movement.

Hereinafter, for the sake of brief explanation, a status that the pointer is positioned to be proximate onto the touch screen without contact will be referred to as 'proximity touch,' whereas a status that the pointer substantially comes in contact with the touch screen will be referred to as 'contact touch.' For the position corresponding to the proximity touch of the pointer on the touch screen, such position will correspond to a position where the pointer faces perpendicular to the touch screen upon the proximity touch of the pointer. The proximity sensor 141 may sense proximity touch, and proximity touch patterns (e.g., distance, direction, speed, time, position, moving status, etc.). Further, the controller 180 can process data (or information) corresponding to the proximity touches and the proximity touch patterns sensed by the proximity sensor 141, and output visual information corresponding to the process data on the touch screen. In addition, the controller 180 can control the watch-type terminal 100 to execute different operations or process different data (or information) according to whether a touch with respect to the same point on the touch screen is either a proximity touch or a contact touch.

A touch sensor may sense a touch (or touch input) applied onto the touch screen (or the display unit 151) using at least one of various types of touch methods, such as a resistive type, a capacitive type, an infrared type, a magnetic field type, and the like.

As one example, the touch sensor may be configured to convert changes of pressure applied to a specific part of the display unit 151 or a capacitance occurring from a specific part of the display unit 151, into electric input signals. Also, the touch sensor may be configured to sense not only a touched position and a touched area, but also touch pressure. Here, a touch object is an object to apply a touch input onto the touch sensor. Examples of the touch object may include a finger, a touch pen, a stylus pen, a pointer or the like.

When touch inputs are sensed by the touch sensors, corresponding signals may be transmitted to a touch controller. The touch controller may process the received signals, and then transmit corresponding data to the controller 180. Accordingly, the controller 180 can sense which region of the display unit 151 has been touched. Here, the touch controller may be a component separate from the controller 180 or the controller 180 itself.

Further, the controller 180 can execute a different control or the same control according to a type of an object which touches the touch screen (or a touch key provided in addition to the touch screen). Whether to execute the different control or the same control according to the object which gives a touch input may be decided based on a current operating state of the watch-type terminal 100 or a currently executed application program.

Meanwhile, the touch sensor and the proximity sensor may be executed individually or in combination, to sense various types of touches, such as a short (or tap) touch, a long touch, a multi-touch, a drag touch, a flick touch, a pinch-in touch, a pinch-out touch, a swipe touch, a hovering touch, and the like.

The camera 121 constituting the input unit 120 may include at least one of a camera sensor (for example, CCD, CMOS, etc.), a photo sensor and a laser sensor. The camera 121 and the laser sensor may be combined to detect a touch of the sensing object with respect to a 3D stereoscopic image. The photo sensor may be laminated on the display device. The photo sensor may be configured to scan a movement of the sensing object in proximity to the touch screen. In more detail, the photo sensor may include photo diodes and transistors at rows and columns to scan content placed on the photo sensor by using an electrical signal which changes according to the quantity of applied light. Namely, the photo sensor may calculate the coordinates of the sensing object according to variation of light to thus obtain position information of the sensing object.

The display unit 151 may output information processed in the watch-type terminal 100. For example, the display unit 151 may display execution screen information of an application program driven in the watch-type terminal 100 or user interface (UI) and graphic user interface (GUI) information in response to the execution screen information. The display unit 151 may also be implemented as a stereoscopic display unit for displaying stereoscopic images. The stereoscopic display unit 152 may employ a stereoscopic display scheme such as stereoscopic scheme (a glass scheme), an auto-stereoscopic scheme (glassless scheme), a projection scheme (holographic scheme), or the like.

The audio output module 152 may output audio data received from the wireless communication unit 110 or stored in the memory 160 in a call signal reception mode, a call mode, a record mode, a voice recognition mode, a broadcast reception mode, and the like. Also, the audio output module 152 may also provide audible output signals related to a particular function (e.g., a call signal reception sound, a message reception sound, etc.) performed by the watch-type terminal 100. The audio output module 152 may include a receiver, a speaker, a buzzer or the like.

A haptic module 153 may generate various tactile effects the that user may feel. A typical example of the tactile effect generated by the haptic module 153 may be vibration. Strength, pattern and the like of the vibration generated by the haptic module 153 may be controllable by a user selection or setting of the controller. For example, the haptic module 153 may output different vibrations in a combining manner or a sequential manner.

Besides vibration, the haptic module 153 may generate various other tactile effects, including an effect by stimulation such as a pin arrangement vertically moving with respect to a contact skin, a spray force or suction force of air through a jet orifice or a suction opening, a touch on the skin, a contact of an electrode, electrostatic force, etc., an effect by reproducing the sense of cold and warmth using an element that can absorb or generate heat, and the like.

The haptic module 153 may be implemented to allow the user to feel a tactile effect through a muscle sensation such as the user's fingers or arm, as well as transferring the tactile effect through a direct contact. Two or more haptic modules 153 may be provided according to the configuration of the watch-type terminal 100.

An optical output module 154 may output a signal for indicating an event generation using light of a light source. Examples of events generated in the watch-type terminal 100 may include a message reception, a call signal reception, a missed call, an alarm, a schedule notice, an email reception, an information reception through an application, and the like.

A signal output by the optical output module 154 may be implemented so the watch-type terminal emits monochromatic light or light with a plurality of colors. The signal output may be terminated as the watch-type terminal senses a user's event checking.

The interface unit 160 may serve as an interface with every external device connected with the watch-type terminal 100. For example, the interface unit 160 may receive data transmitted from an external device, receive power to transfer to each element within the watch-type terminal 100, or transmit internal data of the watch-type terminal 100 to an external device. For example, the interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the watch-type terminal 100 and may include a user identity module (UIM), a subscriber identity module (SIM), a universal subscriber identity module (USIM), and the like. In addition, the device having the identification module (referred to as 'identifying device', hereinafter) may take the form of a smart card. Accordingly, the identifying device may be connected with the terminal 100 via the interface unit 160.

When the watch-type terminal 100 is connected with an external cradle, the interface unit 160 may serve as a passage to allow power from the cradle to be supplied to the watch-type terminal 100 therethrough or may serve as a passage to allow various command signals input by the user from the cradle to be transferred to the watch-type terminal therethrough. Various command signals or power input from the cradle may operate as signals for recognizing that the watch-type terminal is properly mounted on the cradle.

The memory 170 may store programs for operations of the controller 180 and temporarily store input/output data (for example, phonebook, messages, still images, videos, etc.). The memory 170 may store data related to various patterns of vibrations and audio which are output in response to touch inputs on the touch screen. The memory 170 may include at least one type of storage medium including a Flash memory, a hard disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the watch-type terminal 100 may be operated in relation to a web storage device that performs the storage function of the memory 170 over the Internet.

As aforementioned, the controller 180 can typically control the general operations of the watch-type terminal 100. For example, the controller 180 can set or release a lock state for restricting a user from inputting a control command with respect to applications when a status of the watch-type terminal meets a preset condition.

The controller 180 can also perform controlling and processing associated with voice calls, data communications, video calls, and the like, or perform pattern recognition processing to recognize a handwriting input or a picture drawing input performed on the touch screen as characters or images, respectively. In addition, the controller 180 can control one or combination of those components in order to implement various embodiment disclosed herein on the watch-type terminal 100.

The power supply unit 190 may receive external power or internal power and supply appropriate power required for operating respective elements and components included in the watch-type terminal 100 under the control of the controller 180. The power supply unit 190 may include a battery. The battery may be an embedded battery which is rechargeable or be detachably coupled to the terminal body for charging.

The power supply unit 190 may include a connection port. The connection port may be configured as one example of the interface unit 160 to which an external (re)charger for supplying power to recharge the battery is electrically connected. As another example, the power supply unit 190 may be configured to recharge the battery in a wireless manner without use of the connection port. Here, the power supply unit 190 may receive power, transferred from an external wireless power transmitter, using at least one of an inductive coupling method which is based on magnetic induction or a magnetic resonance coupling method which is based on electromagnetic resonance. Various embodiments described herein may be implemented in a computer-readable or its similar medium using, for example, software, hardware, or any combination thereof.

An accessory for protecting an appearance or assisting or extending the functions of the watch-type terminal 100 may further be provided on the watch-type terminal 100. As one example of the accessory, a cover or pouch for covering or accommodating at least one surface of the watch-type terminal 100 may be provided. The cover or pouch may cooperate with the display unit 151 to extend the function of the watch-type terminal 100. Another example of the accessory may be a touch pen for assisting or extending a touch input onto a touch screen.

Figure 1B:
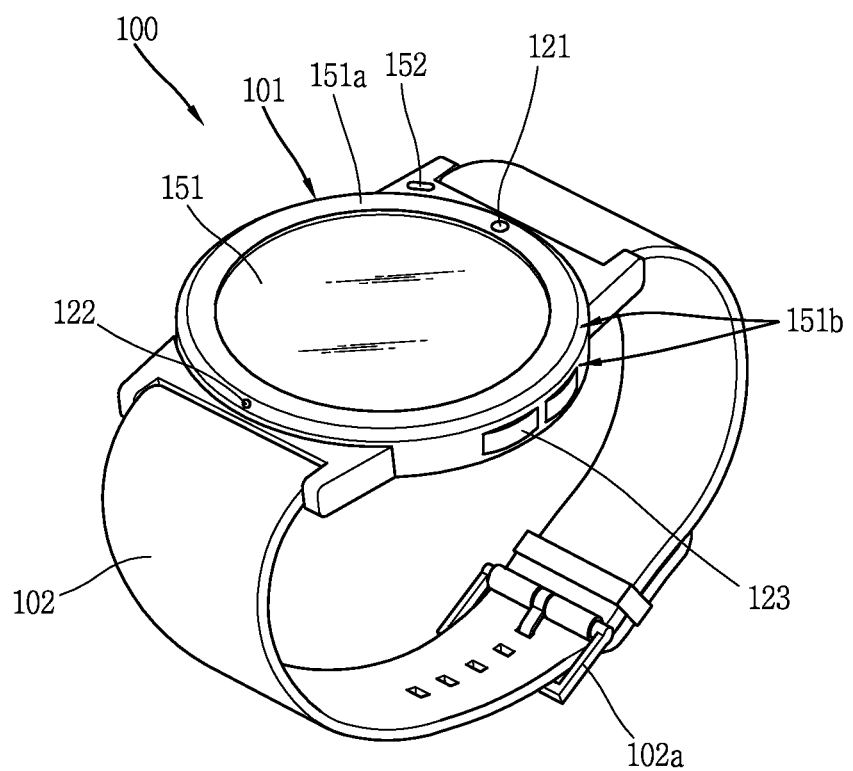
FIG. 1B is perspective view illustrating an example of a watch-type terminal according to an embodiment of the present disclosure.

Next, FIG. 1B is a perspective view illustrating one example of a watch type watch-type terminal 100 according to an embodiment of the present disclosure. As illustrated in FIG. 1B, the watch type watch-type terminal 100 may include a main body 101 with a display unit 151, and a band 102 connected to the main body 101 to be wearable on a wrist. Meanwhile, the watch type watch-type terminal 100 may include the features of the watch-type terminal 100 in FIGS. 1A through 1C or similar features thereof.

The main body 101 may include a case defining an appearance. The case may include a first case and a second case cooperatively defining an inner space for accommodating various electronic components. However, the present disclosure is not limited to this. One case may be configured to define the inner space, thereby implementing a watch-type terminal 100 with a uni-body.

Further, the watch type watch-type terminal 100 can perform wireless communication, and an antenna for the wireless communication may be installed in the main body 101. The antenna may also extend its function using a case. For example, a case including a conductive material may be electrically connected to the antenna so as to extend a ground area or a radiation area.

In addition, the display unit 151 is disposed on a front surface of the main body 101 and may include a touch sensor so as to implement a touch screen. In addition, a window of the display unit 151 may be mounted onto the first case to form a front surface of the terminal body together with the first case.

An audio output module 152, a camera 121, a microphone 122, a user input unit 123 and the like may be disposed on the main body 101. When the display unit 151 is implemented as the touch screen, the display unit 151 can function as the user input unit 123, which can result in excluding a separate key on the main body 101.

In addition, the band 102 is worn on the wrist in a surrounding manner and may be made of a flexible material. As one example, the band 102 may be made of fur, rubber, silicon, synthetic resin or the like. The band 102 may also be configured to be detachable from the main body 101. Accordingly, the band 102 may be replaceable with various types of bands according to a user's preference.

Further, the band 102 may be used for extending the performance of the antenna. For example, the band may include therein a ground extending portion electrically connected to the antenna to extend a ground area. The band 102 may also be provided with a fastener 102*a*. The fastener 102*a* may be implemented into a buckle type, a snap-fit hook structure, a Velcro type, or the like, and include a flexible section or material. FIG. 1B illustrates an example that the fastener 102*a* is implemented into the buckle type.

Furthermore, a bezel portion 151*a* surrounding the shape of the display unit 151 is provided at an edge region of the display unit 151. A touch sensor capable of sensing a touch input may be provided on the bezel portion 151*a*. The bezel portion 151*a* may further include a front bezel portion provided on a front surface of the body and a lateral bezel portion 151*b* extended from the front bezel portion and provided at a lateral surface of the body. In this instance, the controller 180 can generate or execute a different control command based on whether a touch input is applied to the front bezel portion or applied to the lateral bezel portion 151*b*.

Furthermore, the bezel portion 151*a* may be implemented to be mechanically rotated when an external force is applied in one direction. In this instance, the operation of the watch-type terminal 100 may be performed according to the rotational direction and extent of the bezel portion 151*a*.

Also, the watch-type terminal 100 may further include an optical output unit for emitting monochromatic light or a plurality of colors of light from at least one of a front surface, a lateral surface and a rear surface of the touch screen 151 or watch-type terminal 100, when a touch input is applied to the bezel portion 151*a* or the bezel portion 151*a* is mechanically rotated.

In addition, a lateral input unit 123 for receiving an input from a user may be provided on a lateral surface of the body of the watch-type terminal 100. Thus, the watch-type terminal 100 may receive a push input, a wheel input, a touch input or the like applied to the lateral input unit 123 to execute the corresponding control command. Further, the lateral input unit 123 may receive a control command for setting or changing a time according to a preset manipulation.

The foregoing watch-type terminal 100 according to an embodiment of the present disclosure can sense a predetermined touch input being applied to the bezel portions 151*a* or 151*b* surrounding a periphery of the touch screen when preset screen information is displayed on the touch screen 151. Specifically, when a first touch input is applied to the bezel portion, the controller 180 can display an image object indicating status information associated with screen information displayed on the touch screen 151 in one region of the touch screen 151. Here, the image object is a bar-type image displayed in a predetermined length and thickness along a boundary region of the touch screen.

Furthermore, when a first touch input is maintained on the bezel portion and a second touch input for controlling the displayed image object is received at the bezel portion, the controller 180 can execute a first function for changing status information associated with screen information displayed on the touch screen 151. Here, the first function can vary according to screen information displayed on the touch screen 151 or the type of an application corresponding thereto.

In addition, while the first function is performed according to the second touch input, a changing image corresponding to the second touch input is displayed on the displayed image object. In other words, though the first function is performed through a touch input to the touch screen 151 in actuality, it is seen that the first function seems to be performed when a touch input is directly applied to an image object displayed on the touch screen 151.

Further, when a touch position area corresponding to the first touch input is changed while receiving the first touch input or the second touch input, the controller 180 can apply a second function different from the first function to screen information displayed on the touch screen 151. Here, the second function can vary according to screen information displayed on the touch screen 151 or the type of an application corresponding thereto as well as vary according to the changed extent of a touch position area corresponding to the first touch input.

Thus, according to the present disclosure, screen information displayed on the touch screen can be controlled using a touch input to the bezel portion 151*a*, thereby maintaining a user interface environment familiar to the user as well as overcoming the limit of a small-sized screen with the screen hiding of the touch screen 151.

Next, FIGS. 2A through 2E are views illustrating a method of controlling the screen using a touch input to the bezel portion as described above. First, referring to FIG. 2A, screen information corresponding to the execution of at least one application is displayed on the touch screen 151 provided on a front surface of the watch-type terminal 100. The screen information may be a specific photo image 201 according to the execution of a gallery application, for example.

Figure 2A:
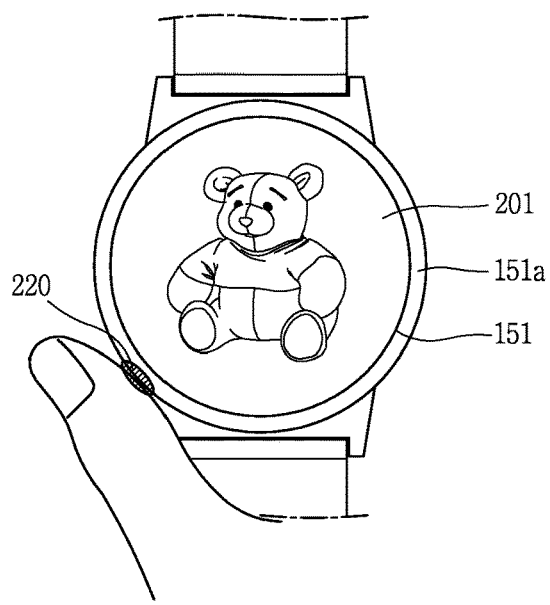
FIGS. 2A through 2E are conceptual views illustrating a method of controlling the screen using a touch input to the bezel portion in a watch-type terminal according to an embodiment of the present disclosure.
Figure 2B:
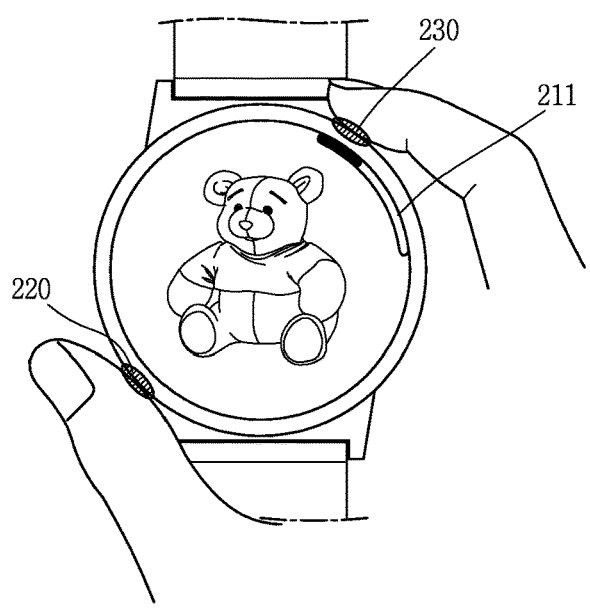

Next, when a touch 220 is applied to the bezel portion 151*a* surrounding a periphery of the touch screen 151, the controller 180 of the watch-type terminal 100 can display a progress bar 211 indicating status information associated with the photo image 201 on a boundary region of the touch screen 151 facing the touched position 220 as illustrated in FIG. 2B.

Here, the bezel portion 151*a* may include both a front bezel portion disposed on a front surface to surround the boundary of the touch screen and a lateral bezel portion extended from the front bezel portion and disposed at a lateral surface thereof. According to the present disclosure, touch inputs applied to the front bezel portion and lateral bezel portion may be processed in a similar manner or processed in a different manner when needed.

Furthermore, the status information may be a screen magnification factor of the photo image 201, for example, but is not limited to this. For example, the progress bar 211 may be any one of a saved location, a saved time and a saved parent folder of the displayed photo image 201.

In addition, the controller 180 can further display an image (for example, an image to which a predetermined transparency or shading effect is applied) corresponding to the location and area of the foregoing touch position 220 on a boundary region of the touch screen 151 corresponding to the foregoing touch position 220. In other words, the bezel portion 151*a* can sense only a touch input, and draw an image corresponding thereto in real time on a boundary region of the touch screen 151, thereby providing an effect similar to performing a touch input to the touch screen 151. As a result, it is possible to prevent an error such as the screen from being hidden by a touch object (for example, finger) due to a small screen size or another displayed object from being unintentionally selected.

Figure 2C:
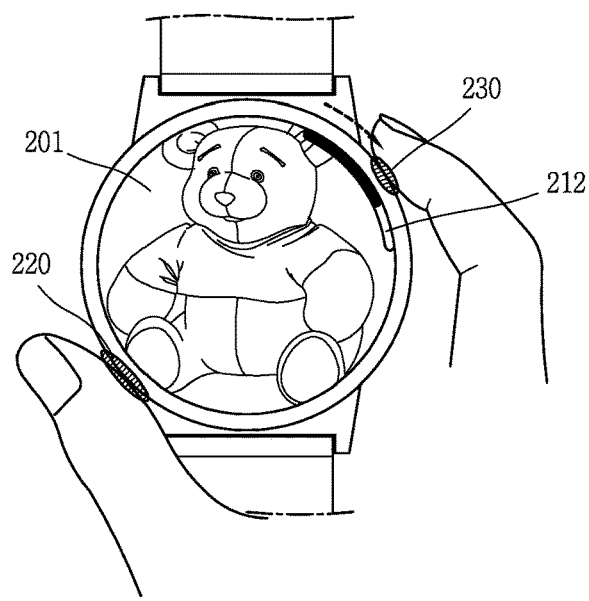

Next, as illustrated in FIGS. 2B and 2C, when a drag input 230 is applied to the bezel portion 151*a* corresponding to an end or one position of the displayed progress bar 211, the controller 180 can control the status of the progress bar 211 according to a drag input applied to the bezel portion 151*a*. Thus, the touch 220 initially applied to the bezel portion 151*a* is maintained while the drag input 230 is applied to the bezel portion 151*a*. For example, when the progress bar 211 is displayed as the user applies a touch ("first touch input") to the bezel portion 151*a* using his or her thumb, he or she can apply a drag ("second touch input") to the bezel portion 151*a* using his or her index finger to control the status of the progress bar 211. As the status of the progress bar 211 is controlled as described above, the controller 180 can adjust a screen magnification factor of the displayed photo image 201.

For example, when a drag input is applied in a clockwise direction to the bezel portion 151*a*, the controller 180 can gradually extend the length of the progress bar 211 in a clockwise direction 212, and increase a screen magnification factor of the photo image 201 that has been displayed on the touch screen 151 at the same time. When the photo image 201 is adjusted to the user's desired screen magnification factor and the second touch input and/or first touch input is released, the controller 180 can stop displaying the progress bar 211. The progress bar 211 in FIGS. 2B and 2C guide the user about the zooming ratio of the displayed image 201 as an example.

Further, when a touch area corresponding to the first touch input is changed while the first touch input is applied to the bezel portion 151*a*, the controller 180 can stop displaying the progress bar 211 and display an icon for executing a different function associated with the photo image 201 on the touch screen 151.

Figure 2D:
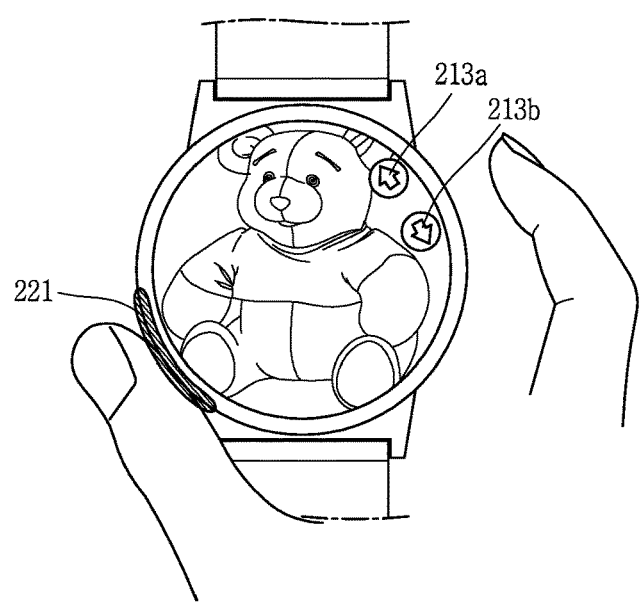

For example, as illustrated in FIG. 2D, when an area of the touch position 220 initially applied to the bezel portion 151*a* is increased to the touch position 221, the controller 180 can display icons 213*a* and 213*b* for displaying a different image or content associated with the photo image 201 instead of the progress bar on the touch screen 151. The controller 180 can further display an image (for example, an image to which a predetermined transparency or shading effect is applied) corresponding to the touch position 221 with an increased area on a boundary region of the touch screen 151, thereby allowing the user to recognize a change of touch area.

For example, the controller 180 can display a first icon (for example, image "<") 213*a* and a second icon (for example, image ">") 231*b* for moving to a previous image or next image associated with the displayed photo image 201 on a boundary region of the touch screen 151 facing the changed touch 221.

Figure 2E:
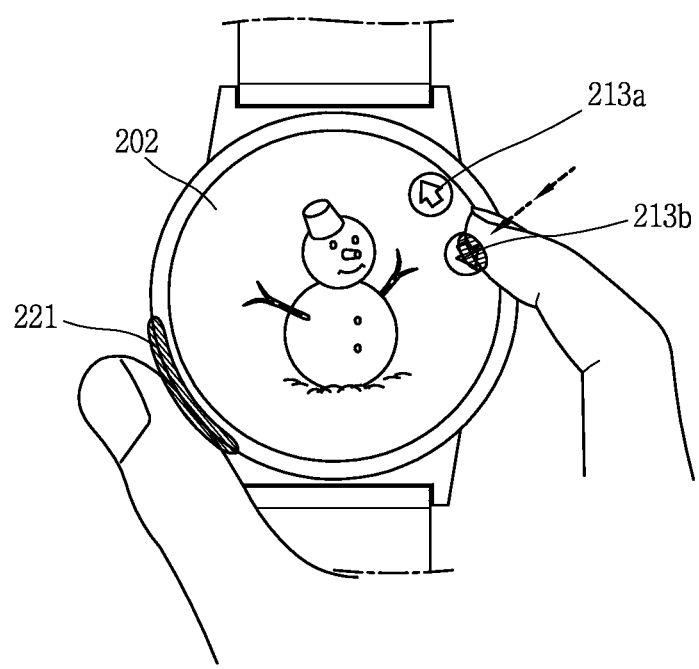

When icons 213*a* and 213*b* for executing a different function associated with the displayed photo image 201 are displayed, and a touch input is applied to the bezel portion 151*a* corresponding to the second icon 213*b* or applied to the second icon 213*b* as illustrated in FIG. 2E, for example, the controller 180 can switch the current photo image 201 to the next image 202. In an alternative embodiment, the user can touch the second icon 213*b*.

As described above, according to the present disclosure, a screen displayed on the touch screen can be controlled using a touch input to the bezel portion, thereby minimizing screen hiding due to the touch input while maintaining an intuitive input scheme.

Hereinafter, FIG. 3 is a flow chart illustrating a method of controlling the screen using a touch input to the bezel portion in a watch-type terminal according to an embodiment of the present disclosure. Referring to FIG. 3, the controller 180 displays preset screen information on the display unit 151 provided on a front surface of the watch-type terminal 100 (S310). Here, there is no restriction on screen information displayed on the touch screen 151. For example, the screen information may be any one a locked screen, a home screen, and an execution screen corresponding to the execution of a specific application.

Next, the controller 180 of the watch-type terminal 100 recognizes a first touch input being received at the bezel portion 151a surrounding a periphery of the touch screen through the sensing unit 140 (S320). Here, the first touch input may denote a single touch input applied to one position of the foregoing front bezel portion or lateral bezel portion.

When the first touch input is received at the bezel portion 151a as described above (Yes in S320), the controller 180 displays an image object indicating status information associated with screen information displayed on the touch screen 151 in one region of the touch screen 151 (S330). Here, as a control object displayed in a predetermined region of the touch screen 151 according to the first touch input being received, the image object may be a progress bar formed along a boundary region of the touch screen, for example.

Furthermore, the controller 180 can control the displayed location of the image object to vary based on a position at which the first touch input is received. Specifically, the controller 180 can display an image object on a boundary region of the touch screen facing a position at which the first touch input is received.

Figure 4:
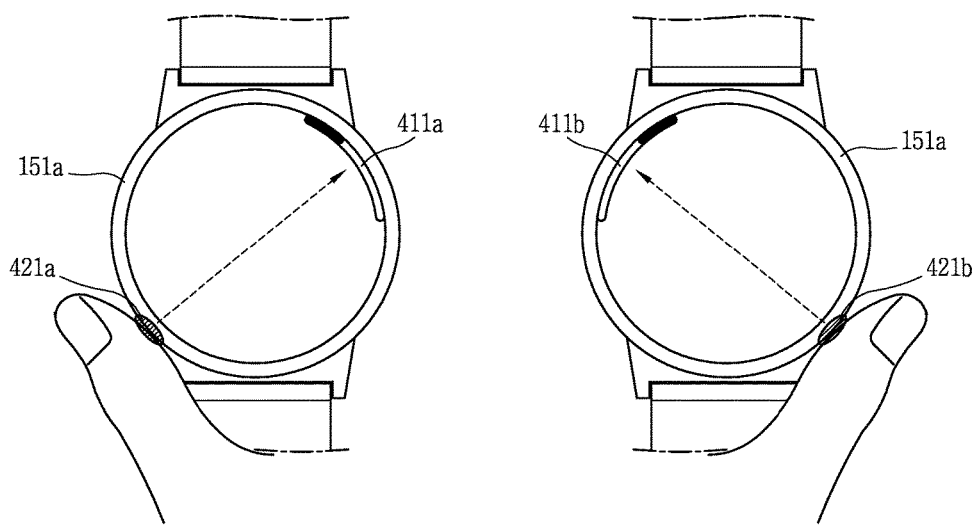
FIG. 4 is a view illustrating a method of displaying an image object corresponding to a touch input to the bezel portion in a watch-type terminal according to an embodiment of the present disclosure.

For example, referring to FIG. 4, when a touch is received at a first position 421a of the bezel portion 151a, an image object can be displayed on a boundary region 411a of the touch screen in a 2 o'clock direction opposite thereto, and when a touch is received at a second position 421b of the bezel portion 151a, an image object can be displayed on a boundary region 411b of the touch screen in a 10 o'clock direction opposite thereto. This advantageously allows touch positions corresponding to the first and the second touch inputs, respectively, to be naturally separated according to a user's finger spacing for applying a first touch input using his or her thumb (index finger) and then applying a second touch input using his or her index finger (thumb) when a two-finger-based touch input is used.

Furthermore, the controller 180 can limit the image object to be displayed only while maintaining the first touch input. In other words, when a first touch input applied to the bezel portion 151a is released (touch-up or touch-off), the controller 180 can control the displayed image object, for example, progress bar, to fade out.

Next, when a second touch input for controlling the displayed image object is received while maintaining the first touch input (Yes in S340), the controller 180 can execute a first function for changing status information associated with screen information displayed on the touch screen 151 (S350). Here, the second touch input may vary according to the type or status of the displayed image object. For example, when the displayed image object is a bar type such as a progress bar, the second touch input may be a drag input rotated in one direction.

Alternatively, when the displayed image object is an icon type, the second touch input may be a single touch input or double touch input applied to one position. Still alternatively, for example, when the displayed image object is gradually changed in the image according to a touch input, a touch input can be changed to a different mode corresponding to the changed image or performed with a combination of different touch modes.

Furthermore, the controller 180 can apply a first function for changing status information associated with screen information in a different manner according to the type of the screen information displayed on the touch screen 151. For example, when a home screen is displayed on the touch screen 151, the first function may be a function of executing a predetermined application. In addition, when a screen displayed on the touch screen 151 is a list containing at least one content, the first function may be a function of scrolling the content contained in the list in a direction corresponding to the second touch input. In another example, when a screen displayed on the touch screen 151 is a specific image, the first function may be a function of enlarging or reducing the specific image.

Further, when a first touch input is received, and a change of touch area corresponding to the first touch input is sensed (Yes in S360), the controller 180 can apply a second function different from the first function to screen information displayed on the touch screen 151 (S370). Here, the second function may include both a function completely different from the first function corresponding to the second touch input or where the application range of the first function is different. In the latter case, when the first function is scrolling a content contained in the list in the unit of lines, the second function may be scrolling the content contained in the list in the unit of contents/folders.

Further, the controller 180 can display an image indicating a location, an intensity, an area and the like of the first touch input on the touch screen 151 so the user can visually recognize a change of touch area corresponding to the first touch input. For example, the controller 180 can display a fingerprint image corresponding to the first touch input to have a preset transparency on a boundary region of the touch screen 151 in contact with the touched position.

In this instance, when the touch intensity of the first touch input is increased, the controller 180 can increase the transparency of the fingerprint image. Furthermore, when the touch area of the first touch input is increased or decreased, the controller 180 can change the shape of the fingerprint image to correspond to the increased or decreased area. In addition, when the location of the first touch input is changed, the controller 180 can display the displayed location of the fingerprint image to be changed or the length of the fingerprint image to be extended.

Further, when the first touch input is received, the controller 180 can display an icon for executing the second function on the touch screen 151. Here, a region displayed with an image object and a region displayed with an icon for executing the second function can be differentiated from each other. Thus, when a touch input for selecting an icon for executing the second function is applied to the bezel portion 151a or the icon when the icon is displayed on the touch screen 151, the controller 180 can control the second function corresponding to the icon to be applied to screen information displayed on touch screen 151.

Here, as a touch input is applied to the bezel portion 151a, the controller 180 can display an indicator corresponding to the touch input in real time on the icon. For example, when a plurality of touch inputs are applied to the bezel portion 151a with an interval of one second, an indicator (for example, blinking indicator) corresponding to a plurality of touch inputs can be displayed with an interval of one second on an icon displayed on the touch screen 151. Accordingly, the effect of directly touching a small-sized icon can be provided.

Figure 5B:
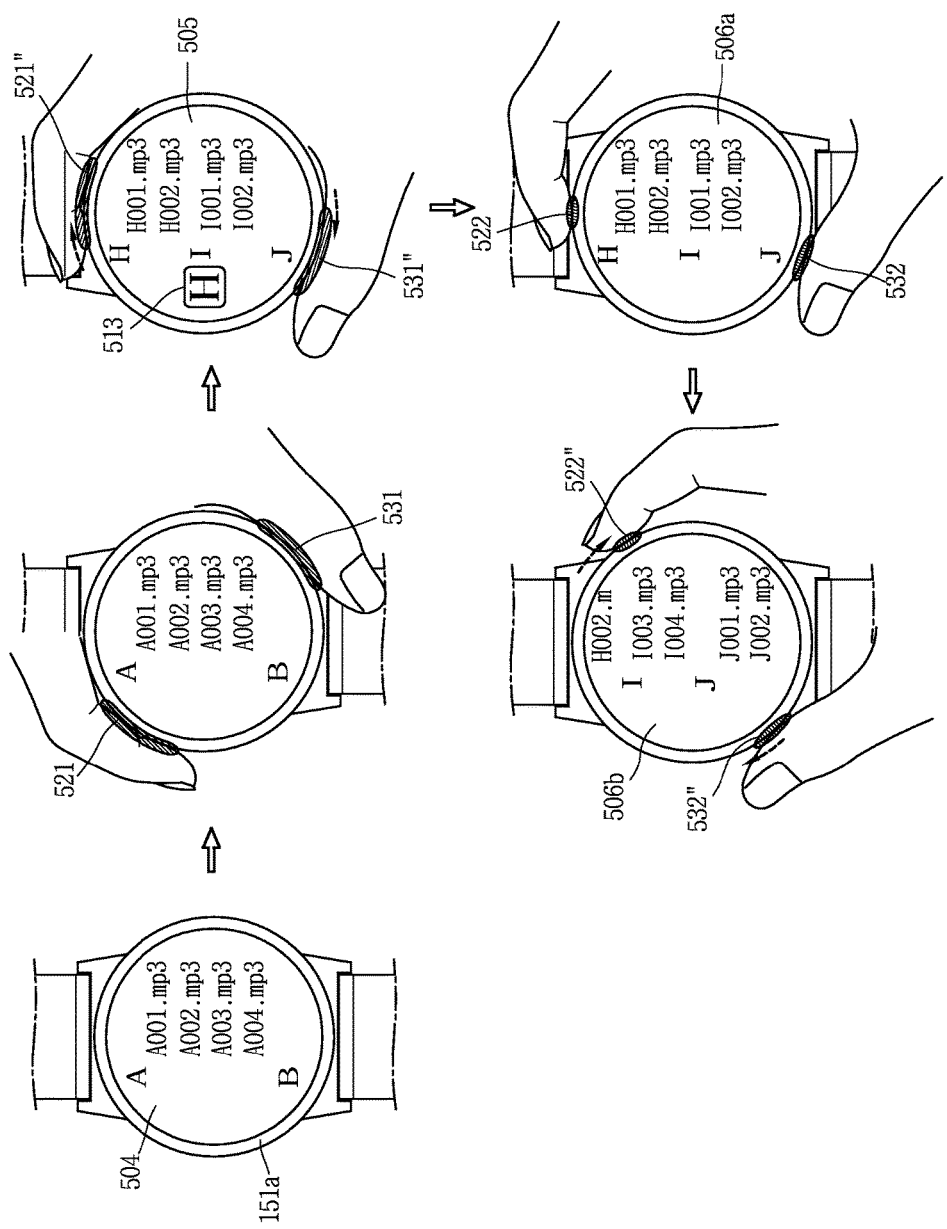

Hereinafter, a method of changing a touch position area applied to the bezel portion to quickly scroll the screen will be described in more detail with reference to FIGS. 5A and 5B. As illustrated in FIG. 5A, when a list 501 containing a plurality of images is displayed on the touch screen, the controller 180 can recognize a touch input applied to touch positions 521 and 531 of the bezel portion 151a. Here, when a user naturally holds a lateral edge of the watch-type terminal 100 in a surrounding manner, the touch positions 521 and 531 may correspond to positions at which the user's thumb and index finger are naturally brought into contact with the bezel portion 151a.

When the touch positions 521 and 531 have a larger area than a reference range, the controller 180 can reduce the size of a plurality of images contained in the list 501 (502a) and display more images on the touch screen 151. Here, a scroll bar 511 indicating the location of photo images is displayed in one region (for example, right boundary region) of the touch screen.

When a second touch input 521" and 531" rotationally moved in one direction (for example, a clockwise direction) is applied, the controller 180 can scroll the list 502a in the unit proportional to a touch area corresponding to the touch positions 521 and 531 (502b). For example, when an area corresponding to the touch positions 521 and 531 is larger than a reference range, the controller 180 can increase the scroll unit to quickly scroll the list 511 (for example, the saved images are quickly scrolled in the unit of months).

Here, time information (for example, "2013. 10") 512 corresponding to the scroll unit can be displayed in an overlapping manner in one region, for example, a central region, of the list 502b. Furthermore, as the list 502b is scrolled as described above, the location of currently displayed photo images can be displayed on the scroll bar 511.

When an area corresponding to the touch positions 521 and 531 is changed, the controller 180 can change the scroll unit or scroll speed of the list 511 in a different manner. For example, when a touch area corresponding to the touch positions 521 and 531 is smaller than a reference range (522 and 532), the controller 180 can increase and display the size of a plurality of images 503a, and when a second touch input 522" and 532" in which the touch positions 522 and 532 with a smaller touch area are rotationally moved in one direction (for example, clockwise direction) is applied, the controller 180 can scroll and display images in a smaller scroll unit, for example, in the unit of lines (503b).

In another example, as illustrated in FIG. 5B, when a list 504 containing at least one audio or sound content is displayed on the touch screen 151, and a second touch input 521" and 531" in which the touch positions 521 and 531 having a larger area than a reference range is applied to the bezel portion 151a, the controller 180 can increase the scroll unit to quickly scroll the list 504 (for example, audio contents are quickly scrolled in the unit of A, B and C). Here, alphabet information (for example, "H") 513 corresponding to the scroll unit can be displayed in one region of the list 505, for example, the left side thereof.

When a touch area corresponding to the touch positions 521 and 531 is smaller than a reference range (522 and 532), and rotationally moved in one direction (522" and 532"), the controller 180 can change the scroll unit in a reduced manner, to control the list 506a in the unit of lines (506b). Further, when the scroll unit is changed to a small scale, the controller 180 can display at least one audio content information contained in the list 506b in a large scale.

According to another embodiment, a scroll speed corresponding to the rotational extent of the touch position can be controlled in a different manner according to the touch area. For example, to increase the scroll speed, the controller 180 can set the touch position to be rotated in a higher speed than a reference value when the touch area is smaller than a reference range, and rotated in a lower speed than the reference value when the touch area is larger than the reference range.

According to the foregoing embodiments, the user can quickly scroll a list with a larger area of the touch positions applied to the bezel portion 151a and then precisely scroll the list with a smaller area of the touch positions when closer to his or her desired location.

Hereinafter, FIGS. 6A, 6B and 7A through 7D illustrate various examples of applying a touch input to the bezel portion and touch screen at the same time to control the screen. First, referring to FIG. 6A, when a plurality of contents 601 are displayed on the touch screen 151 and a touch input is applied to the touch positions 621 and 631 of the bezel portion 151a, the controller 180 can scroll other contents excluding a touched object 611.

When a second touch input 621" and 631" corresponding to the touch positions 621 and 631 being rotationally moved in one direction (for example, a counter clockwise direction) is applied, the controller 180 can scroll the other contents excluding the touched object 611. Here, the controller 180 can limit the scope of the scrolled contents to contents associated with the touched object 611. For example, when the touched object 611 is recognized as a specific person, the controller 180 can limit the scope of the scrolled contents to images containing the recognized specific person.

In addition, the controller 180 can display the touched object 611 in a larger scale than the other contents, display the touched object 611 in a smaller scale than the other contents, display a boundary line of the touched object 611 in a bold style or adjust the transparency thereof to be visually distinguished from the other contents.

Further, while the touch positions 621 and 631 are rotationally moved in one direction, the controller 180 can display the touched object 611 as a pop-up window 611". Accordingly, the touched object 611 is continuously displayed as the popped-up window 611" in a predetermined region of the touch screen 151 or at a location the object 611 has been initially displayed, and the other contents are scrolled in a direction corresponding to a second touch input 621" and 631".

Figure 6A:
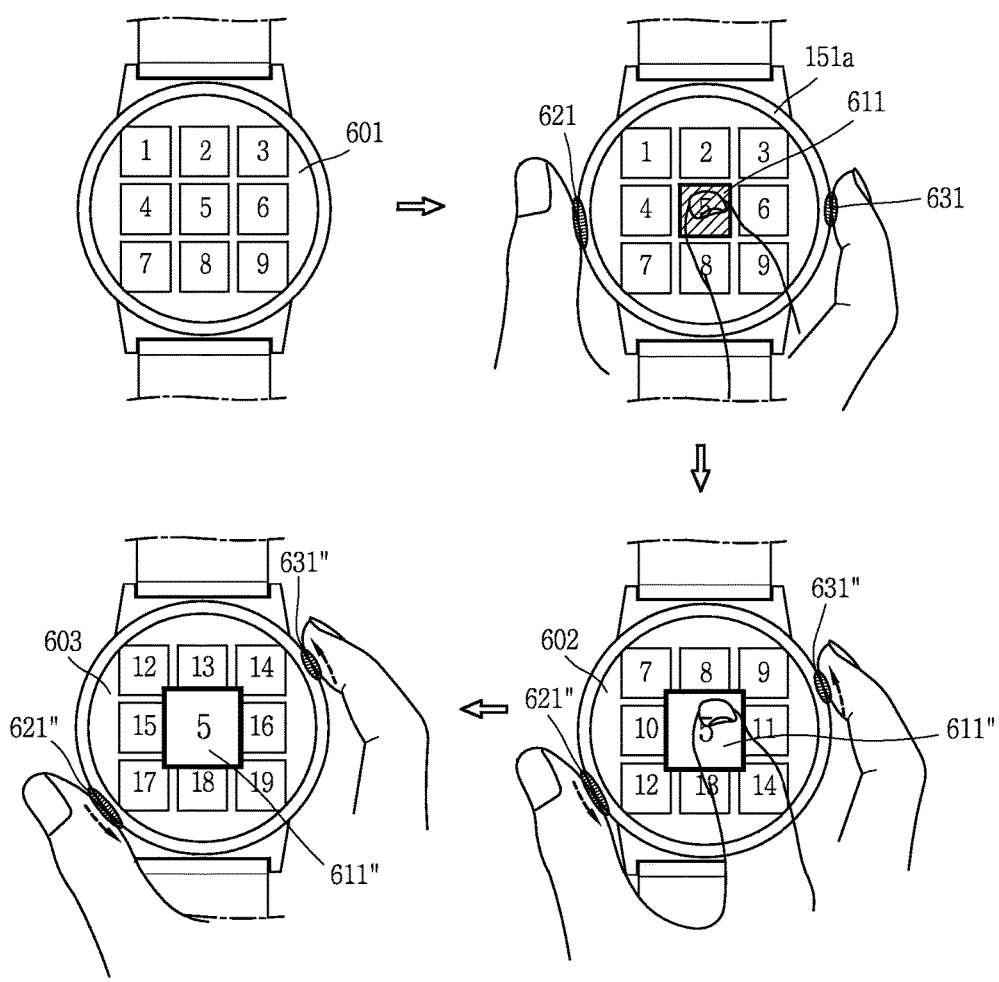
FIGS. 6A, 6B, and 7A through 7D are conceptual views illustrating various methods of controlling the screen using a touch input to the bezel portion and touch screen in a watch-type terminal according to an embodiment of the present disclosure.
Figure 6B:
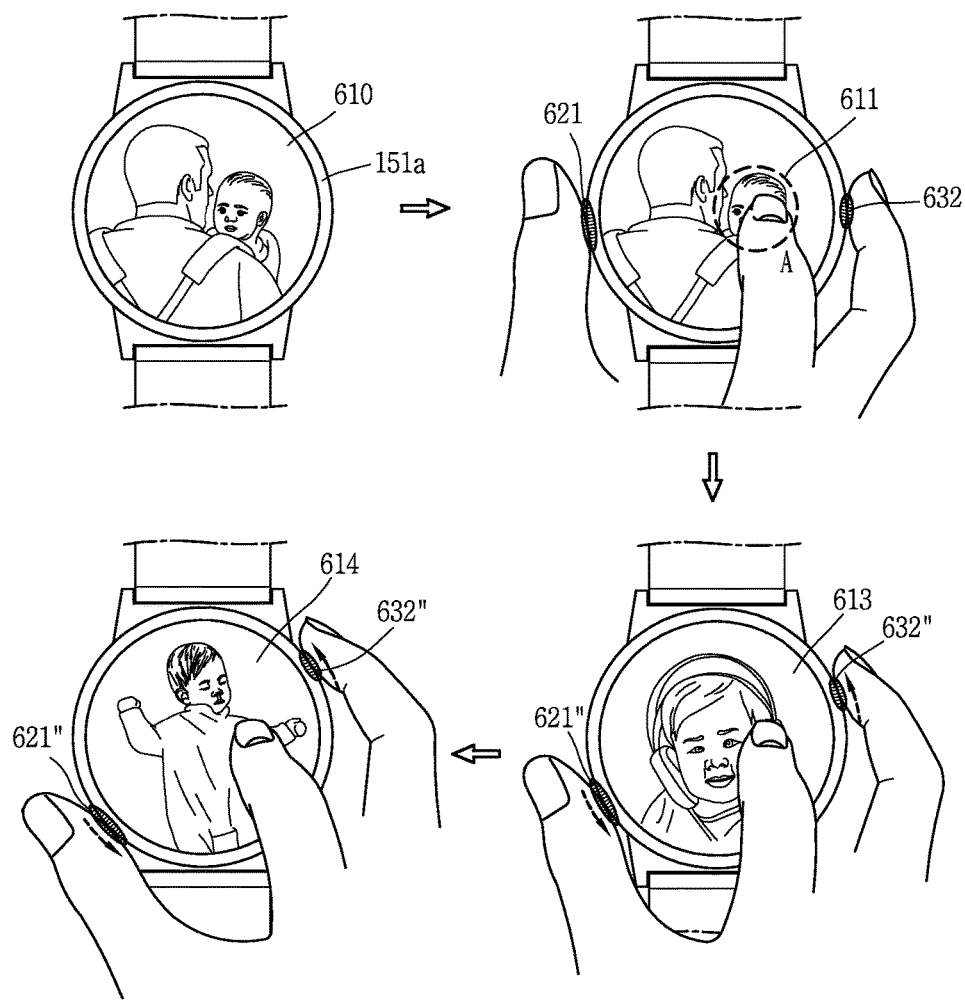

In addition, the display status of the pop-up window 611" can be maintained even when a touch applied to the object 611 is released. In another embodiment, as illustrated in FIG. 6B, when a second touch input 621" and 632" corresponding to touch positions 621 and 631 applied to the bezel portion 151a being rotationally moved in one direction (a counter clockwise direction) is applied when a specific portion (A) of the image displayed on the touch screen 151 is touched, the controller 180 can recognize a face/object image of the touched specific portion (A), and switch the screen to a different image 613 associated with the recognized face/object image. Accordingly, other images 613 and 614 containing the same face/object image 611 as the recognized face/object image are sequentially displayed on the touch screen 151.

Here, the controller 180 can control the scroll direction and scroll extent of the other contents based on the direction and extent of rotationally moving the touch positions 621 and 631. Furthermore, when a touch area of the touch positions 621 and 631 is changed while maintaining the touch positions 621 and 631, the controller 180 can control the unit or speed of scrolling the other contents to vary, thereby selectively performing a quick scroll or precise scroll.

Figure 7A:
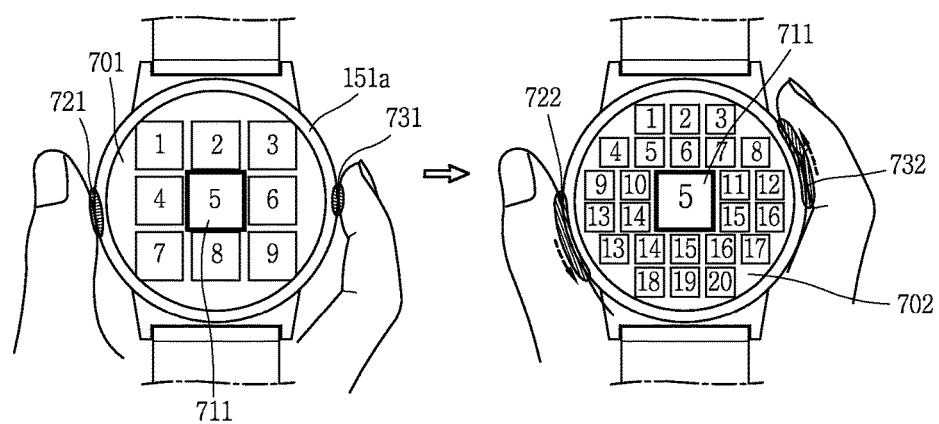

For example, as illustrated in FIG. 7A, when the touched object is displayed as a pop-up window 711 and a touch area corresponding to touch positions 721 and 731 applied to the bezel portion 151a is increased (722 and 732), the controller 180 can control the screen such that the size of images displayed on the touch screen 151 is reduced to display more images, thereby performing a quicker scroll.

Figure 7B:
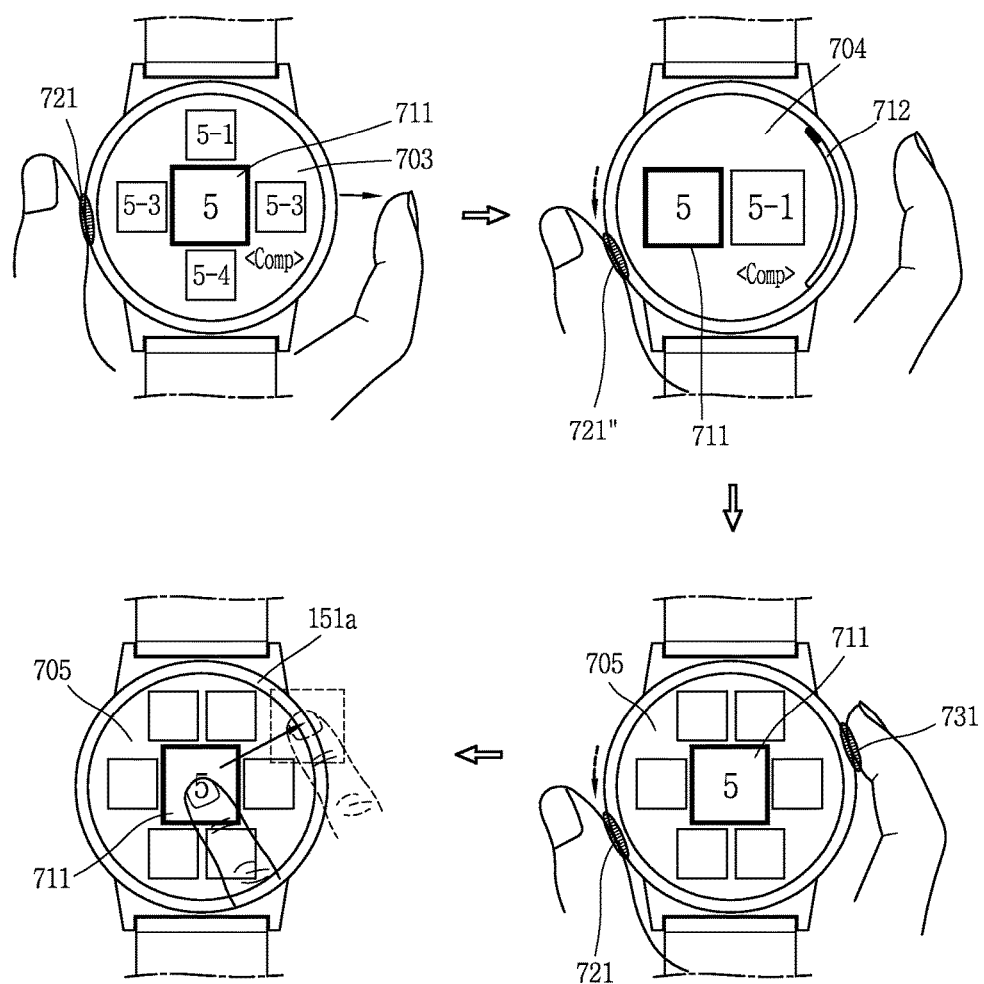

In another example, referring to FIG. 7B, when the touched object is displayed as a pop-up window 711 and any one of the touch positions 721 and 731 applied to the bezel portion 151a is released, the controller 180 can stop scrolling the content and enter a compare mode for comparing the contents in the pop-up window 711 with any one of the other contents displayed on the touch screen.

When entering the compare mode, the controller 180 can change a screen magnification factor of at least one of the other contents displayed on the touch screen 151 according to the other one of the touch positions applied to the bezel portion 151a being rotationally moved, thereby controlling the screen to allow visual comparison with the touched object.

For example, when entering a compare mode, the controller 180 can arrange contents 5-1, 5-2, 5-3 and 5-4 associated with the selected object around the pop-up window 711. Next, when another touch position fixed to the bezel portion 151a is rotationally moved in one direction (721"), the controller 180 can display the pop-up window 711 at the left side of the screen 704 and display the first content 5-1, second content 5-2, third content 5-3 and fourth content 5-4, one by one, according to the rotationally moved direction and extent at the right side thereof to compare the arranged contents 5-1, 5-2, 5-3 and 5-4 with the pop-up window 711. At this time, a progress bar 712 indicating the location of the displayed contents can be displayed along with the pop-up window 711 on the right boundary region of the screen 704.

In such a compare mode, when a drag input toward the pop-up window 711 is applied to a specific content displayed on the right, the controller 180 can allow the specific content to be contained in the pop-up window 711 and display the next content on the right. In addition, the object and contents contained in the pop-up window 711 can be stored in the same folder.

Further, when the touch position 731 is applied again to the bezel portion 151a when the other touch position 721 is maintained, the controller 180 can release the compare mode, and accordingly switch a current screen to a previous screen 705 containing the pop-up window 711 and the other contents. Also, when a touch applied to the pop-up window 711 is dragged to the bezel portion 151a, the controller 180 can stop displaying the pop-up window 711.

Figure 7C:
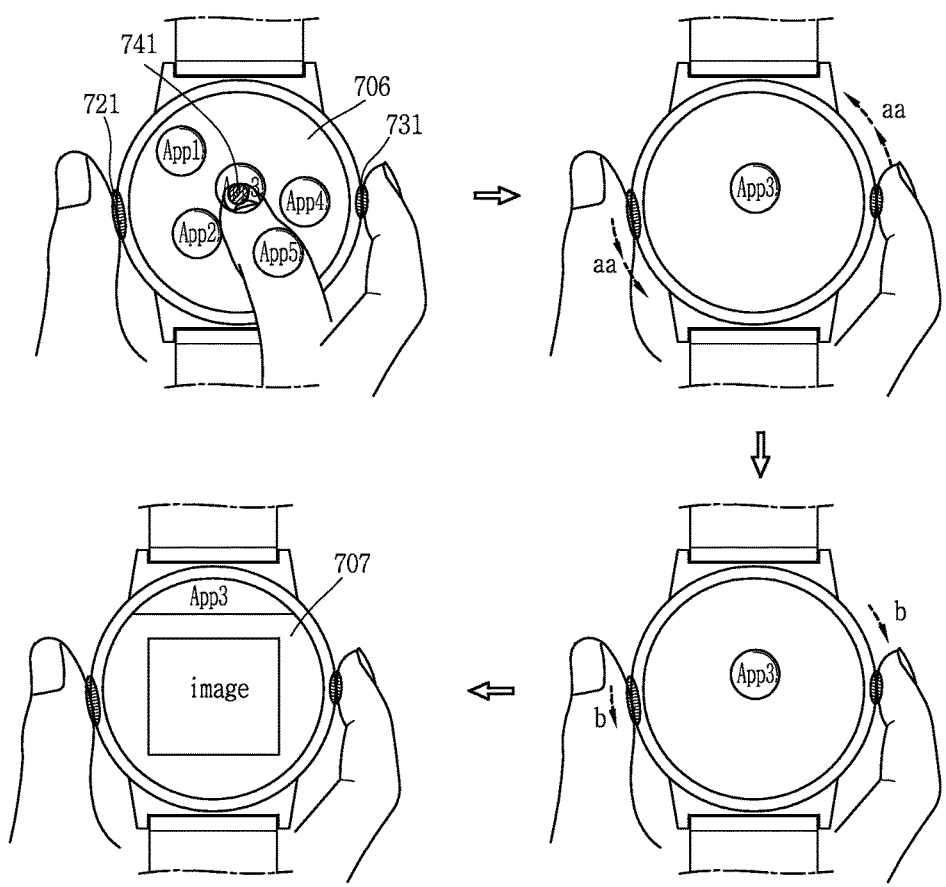

In another example, referring to FIG. 7C, when a home screen 706 containing a plurality of application icons is displayed and the execution of a specific application icon (for example, "App3") 741 selected by a touch is set to a locked state, the controller 180 can switch the locked state to a released state as recognizing a touch positions 721 and 731 applied to the bezel portion 151a being rotated in a preset direction and number of times. For example, when rotating the touch positions 721 and 731 applied to the bezel portion 151a twice in a counter clockwise direction and subsequently rotating them once in a counter clockwise direction corresponds to a preset pattern, the execution screen 707 of the specific application icon 741 can be displayed on the touch screen 151.

Figure 7D:
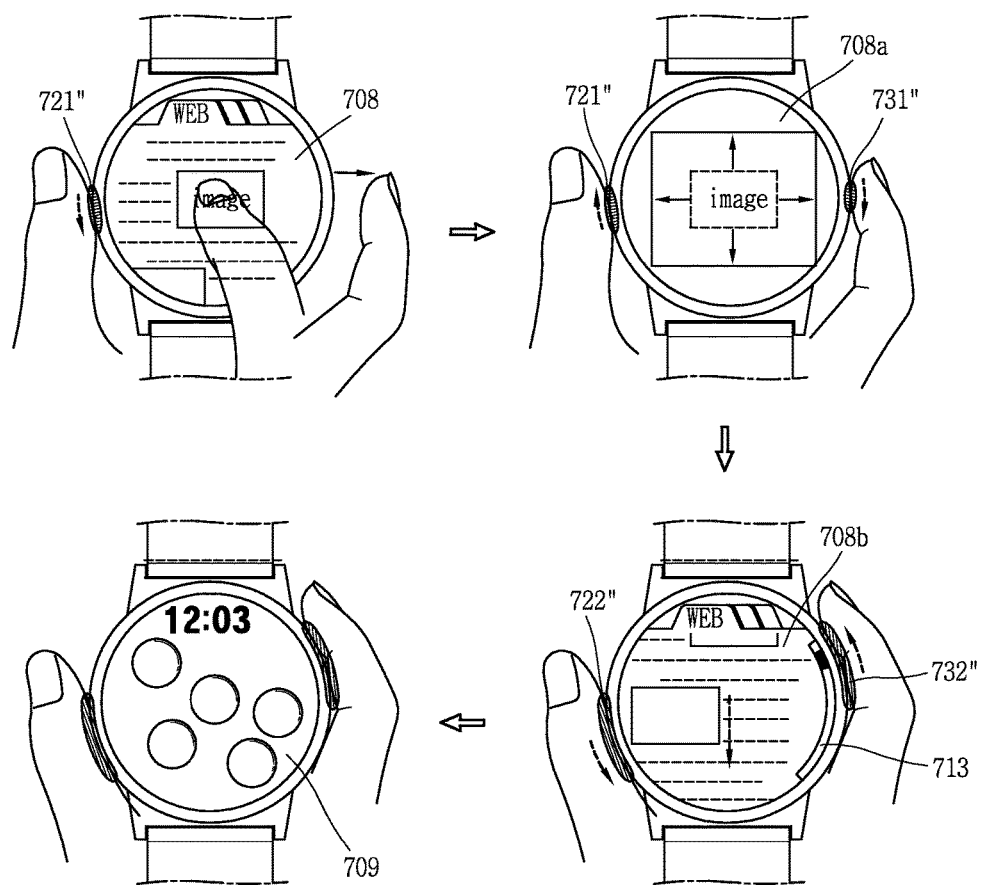

In another example, referring to FIG. 7D, when the execution screen 708 of a web application containing at least one image is displayed on the touch screen 151 and one touch position 721" applied to the bezel portion 151a is rotationally moved in one direction (for example, counter clockwise direction) when the displayed image is touched, the controller 180 can display the displayed image in an enlarged/reduced scale as shown in the execution screen 708a. When a touch area corresponding to the touch position 721" and another touch position 731" added thereto is increased and rotationally moved in one direction (for example, clockwise direction), the controller 180 can quickly scroll the execution screen 708 of the web application and display screen information 708b. A progress bar 713 can also be displayed.

Meanwhile, when the touch positions 722" and 732" are rotationally moved in a direction opposite to the above (for example, counter clockwise direction), the controller 180 can terminate the application being executed and restore a previous screen (for example, home screen) 709. According to the foregoing embodiments, a touch input can be applied to the bezel portion and touch screen in various combinations to generate different control commands for controlling the screen.

Figure 8:
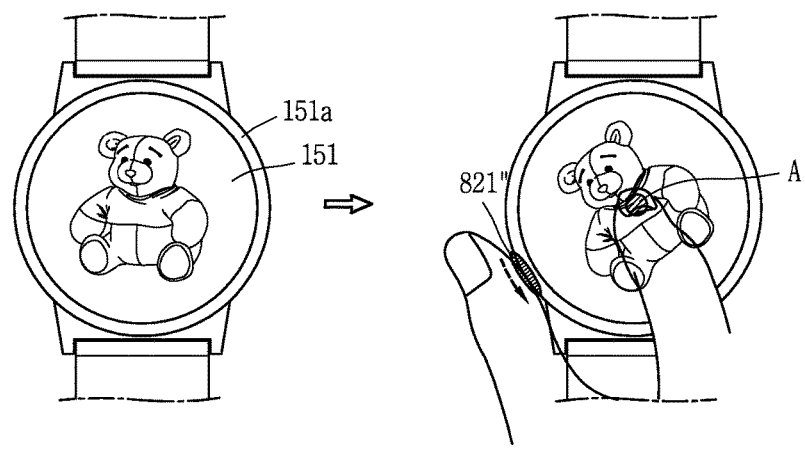
FIG. 8 is a view illustrating a method of changing the display direction of the screen using a touch input to the bezel portion and touch screen in a watch-type terminal according to an embodiment of the present disclosure.

Hereinafter, FIG. 8 is a view illustrating a method of quickly changing the display direction of the screen using a touch input to the bezel portion and touch screen in a watch-type terminal according to an embodiment of the present disclosure. Referring to FIG. 8, when at least one image is displayed on the touch screen 151 and a second touch input 821" applied to one position of the bezel portion 151a is rotationally moved in one direction and when a touch (A) is applied to the image, the controller 180 can change the display direction of the displayed image according to the direction and extent of the rotational movement. Meanwhile, when a plurality of images are displayed and a touch (A) is applied to any one image, the controller 180 can control only the display direction of the selected any one image to be changed.

Figure 9:
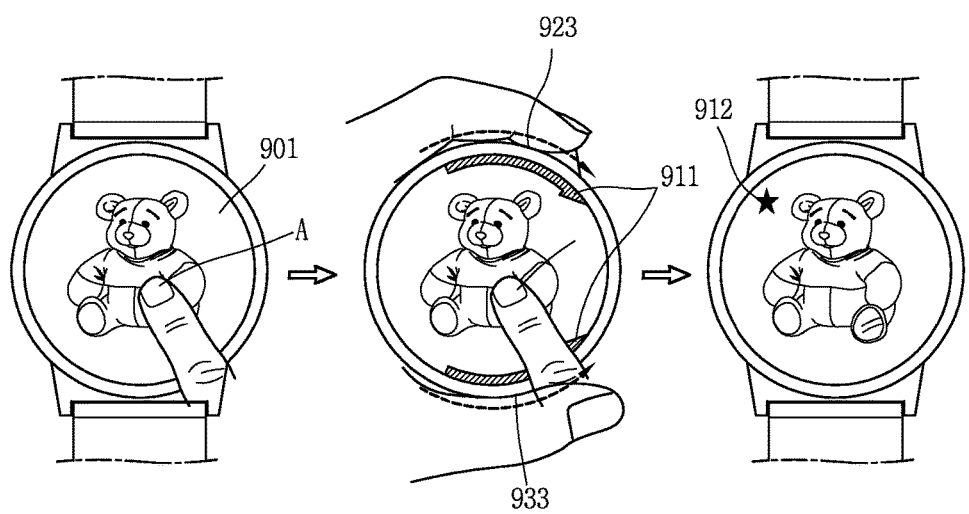
FIG. 9 is a view illustrating a method of performing a bookmark using a touch input to the bezel portion and touch screen in a watch-type terminal according to an embodiment of the present disclosure.

Hereinafter, FIG. 9 is a view illustrating a method of quickly setting a bookmark using a touch input to the bezel portion and touch screen in a watch-type terminal according to an embodiment of the present disclosure. Referring to FIG. 9, when a specific image 901 is displayed on the touch screen 151 and a touch positions 923 and 933 applied to the bezel portion 151a are dragged closer to each other when a touch (A) is applied to the image 901, a link address corresponding to the displayed specific image 901 is set to a bookmark. For example, a user can touch a specific image 901 with one hand and the thumb and index finger of the other hand are separated to take an action of sweeping down the bezel portion 151a, thereby performing the foregoing touch gesture.

At this time, the controller 180 can display an image object 912 indicating that it is set to a bookmark on the specific image 901. Further, the controller 180 can display an image object 911 being changed according to the separated touch positions 923 and 933 applied to the bezel portion 151a being dragged closer to each other on a boundary region of the touch screen 151 corresponding to the touch positions 923 and 933, respectively.

In addition, the controller 180 can display text information (for example, "bookmark") indicating a function to be executed afterwards (for example, bookmark setting) when the image object 911 is displayed within a reference range, and bookmark setting is cancelled to fade out the image object 911 when the touch positions 923 and 933 are released within a reference time (for example, one second). Further, when touch positions 923 and 933 applied to the bezel portion 151a are dragged away from each other when a bookmarked image 901 is touched, the controller 180 can release the set bookmark.

Figure 10A:
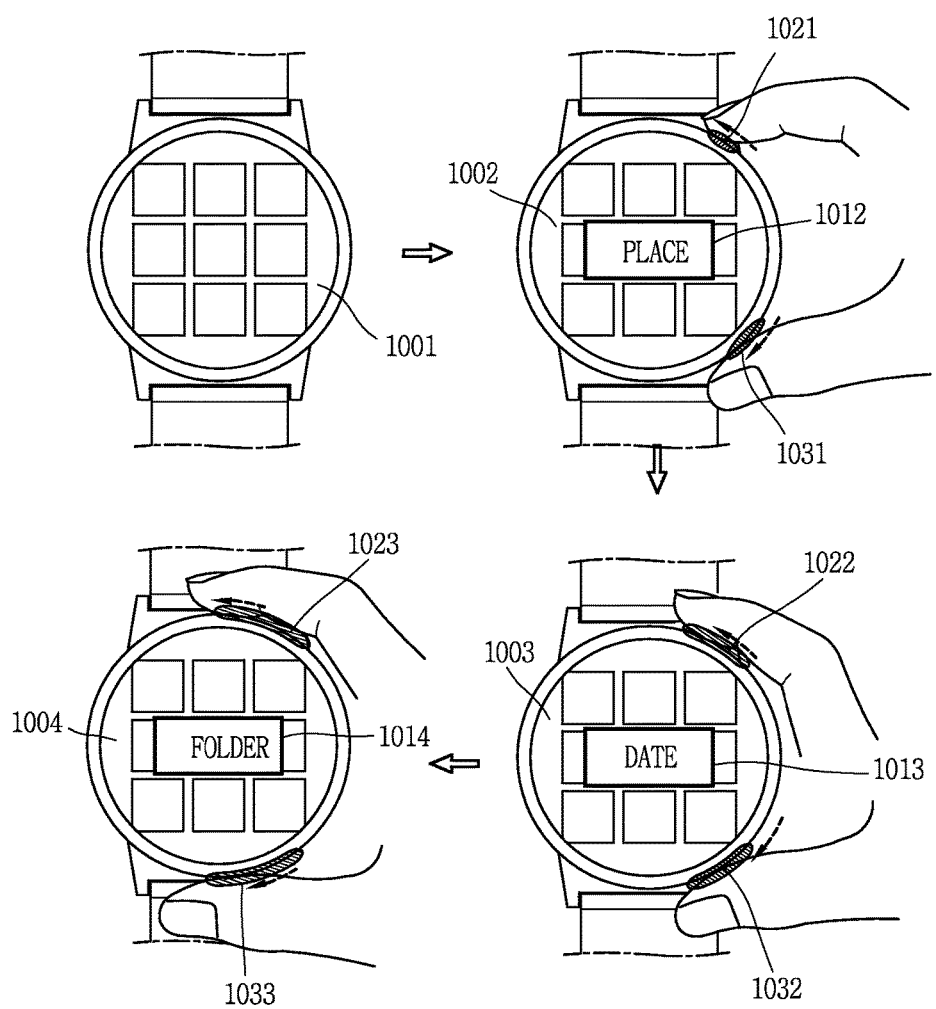
FIGS. 10A and 10B are views illustrating a method of reconfiguring a list using a touch input to the bezel portion in a watch-type terminal according to an embodiment of the present disclosure.
Figure 10B:
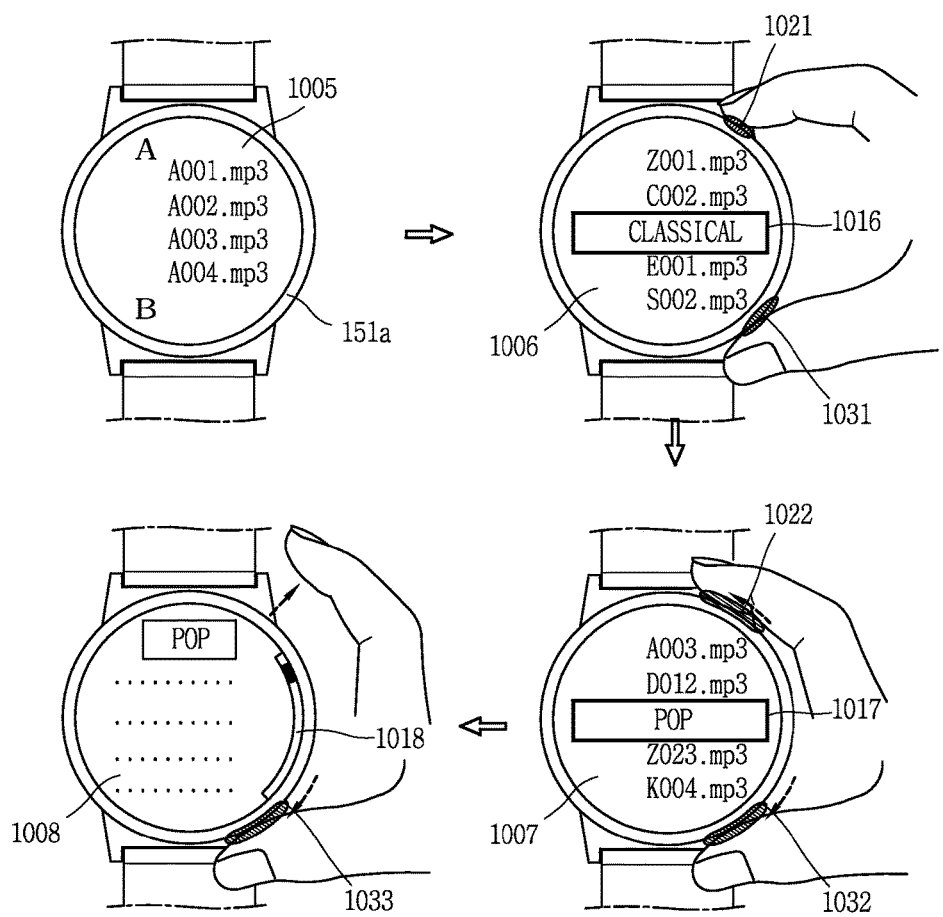

Next, FIGS. 10A and 10B are views illustrating a method of reconfiguring a list using a touch input to the bezel portion in a watch-type terminal according to an embodiment of the present disclosure. Referring to FIG. 10A, when a list 1001 containing at least one content is displayed on the touch screen 151 and a plurality of touch positions applied to the bezel portion 151a are sensed as being away from each other or closer to each other, the controller 180 can reconfigure the list 1001.

When a distance between a plurality of touch positions applied to the bezel portion 151a corresponds to a set reference distance, the controller 180 can reconfigure the list 1001 in a scheme corresponding to the set reference distance. For example, when a distance between a plurality of touch positions is changed to A (1021 and 1031), B (1022 and 1032) and C (1023 and 1033), a list 1002 reconfigured for each place, a list 1003 reconfigured for each date and a list 1004 reconfigured for each folder can be sequentially displayed. In addition, text information (for example, "place" 1012, "date" 1013, "folder" 1014) indicating a reconfiguration criterion can appear and then disappear in one region of, for example, at the center of the reconfigured lists 1002, 1003 and 1004.

The controller 180 can also display a graphic object indicating a touch positions on a boundary region of the touch screen while receiving the touch positions at the bezel portion 151a. In this instance, the controller 180 can display an image changed according to the touch positions applied to the bezel portion 151a being away or closer to each other on the graphic object, thereby visually displaying the extent of the touch positions being separated.

In addition, the controller 180 can set or change a reconfigured list criterion in advance according to the foregoing distance between the touch positions based on a user's input. When one of a touch positions applied to the bezel portion 151a is dragged in one direction when another one is fixed, the controller 180 can scroll the reconfigured list. For example, when one of a touch positions 1023 and 1033 applied to the bezel portion 151a is fixed and another one is dragged in one direction when a list 1004 reconfigured for each folder is displayed, the controller 180 can quickly scroll contents contained in the list 1004 reconfigured for each folder in the scroll unit corresponding to a touch area of the fixed touch position.

In another example, referring FIG. 10B, when an audio play list 1005 containing at least one audio content is displayed on the touch screen 151 and a plurality of touch positions applied to the bezel portion 151a are sensed to be away from each other or closer to each other, the controller 180 can reconfigure the sound play list 1005. For example, when a distance between a touch positions is changed from A (1021 and 1031) to B (1022 and 1032), in the order of a classic sound play list 1016 and a pop sound play list 1017 can be changed as illustrated in FIG. 10B.

Also, when any of the touch positions 1022 and 1032 is released, the controller 180 can rotationally move the other fixed position 1033 to scroll audio contents contained in the pop sound play list 1007 one by one. As described above, a distance between a touch positions applied to the bezel portion 151a may be controlled to quickly reconfigure a list displayed on the touch screen 151 according to a set criterion.

Figure 11A:
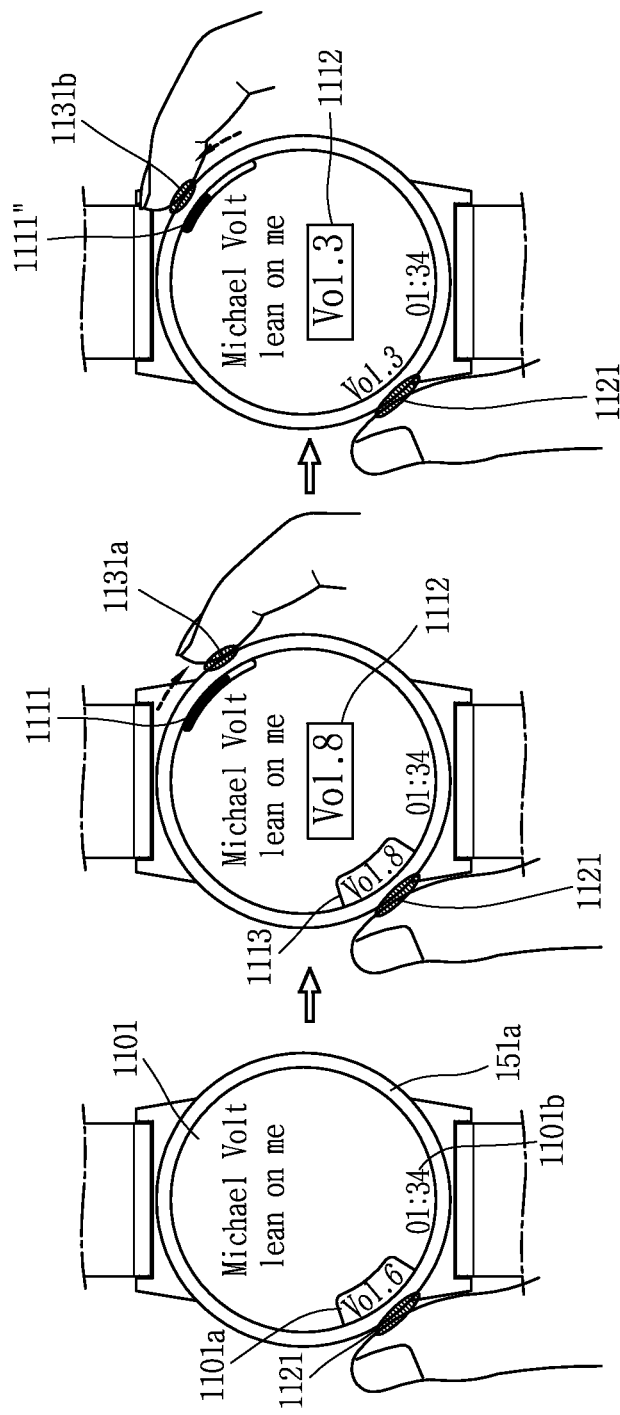
FIGS. 11A through 11C are views illustrating a method of controlling the operation state of a sound source being played using a touch input to the bezel portion and touch screen in a watch-type terminal according to an embodiment of the present disclosure.
Figure 11B:
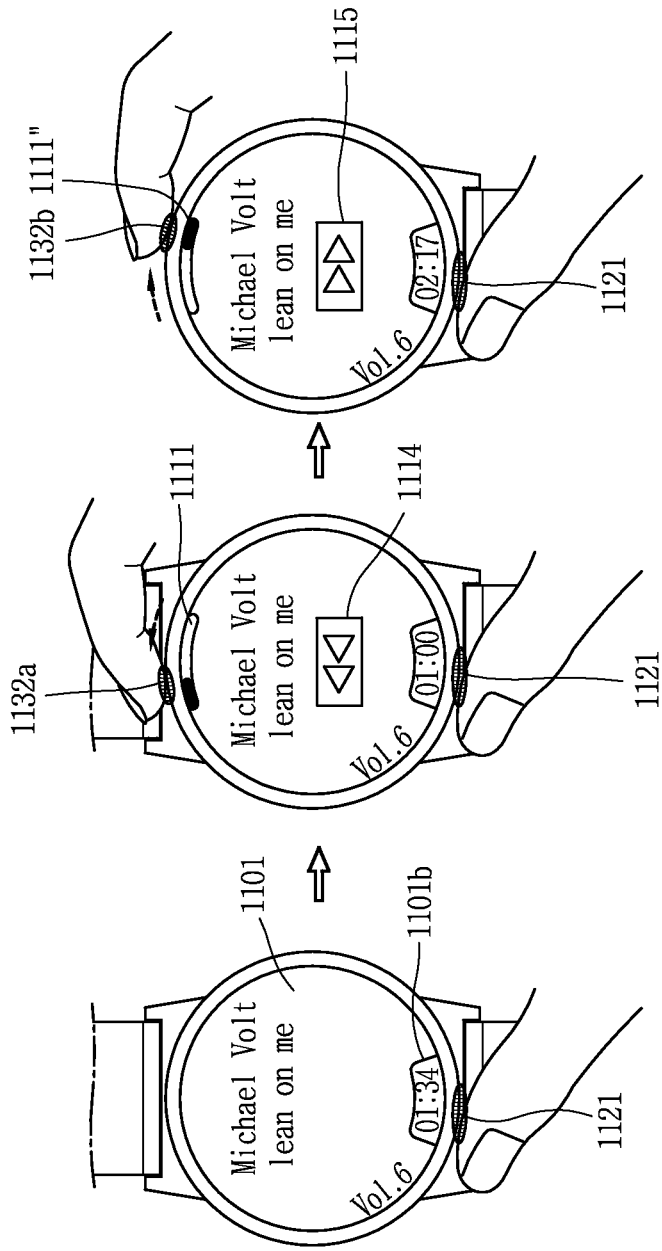
Figure 11C:
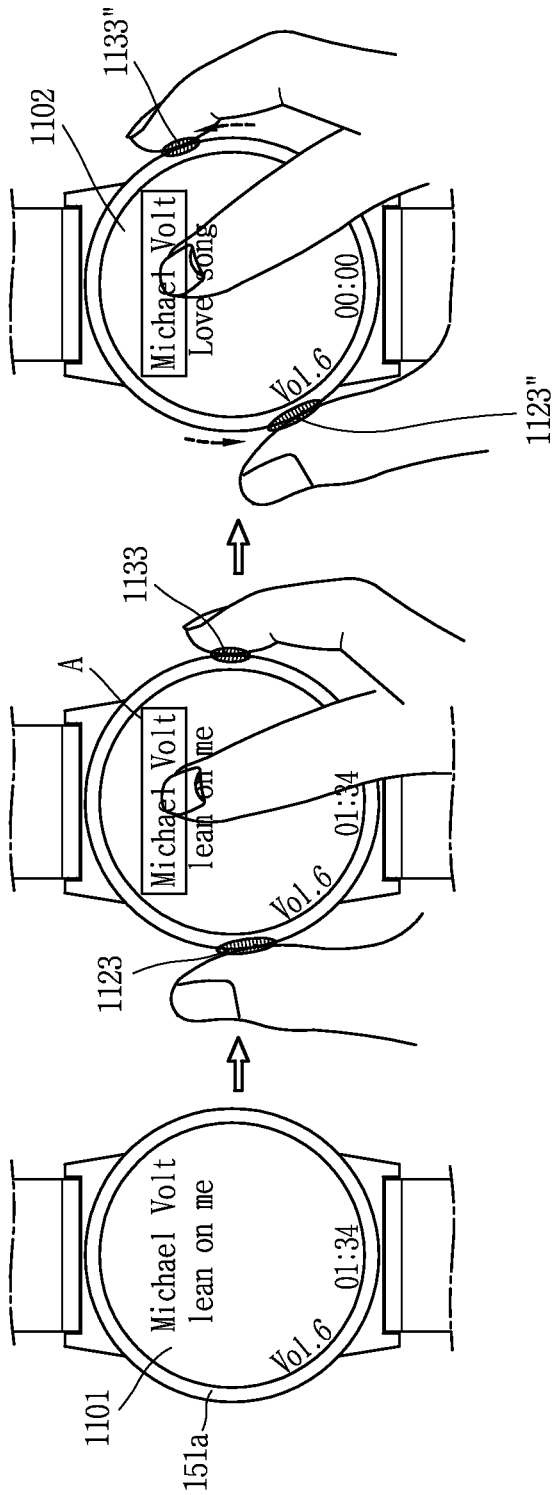

Next, FIGS. 11A through 11C illustrate various methods of controlling the operation state of a sound (audio) source being played using a touch input to the bezel portion and touch screen in a watch-type terminal according to an embodiment of the present disclosure. In particular, FIGS. 11A and 11B are examples of executing a different operation associated with an audio source being played according to a location to which a touch position is applied on the bezel portion 151a. Furthermore, FIG. 11C is an example of applying current touch inputs to the bezel portion 151a and touch screen 151 to move it to another audio source associated with an audio source being played.

First, referring to FIGS. 11A and 11B, the controller 180 displays a screen 1101 indicating audio source information is being played on the touch screen 151, and text information indicating status information associated with the screen 1101 on a boundary region of the touch screen 151. For example, time information (for example, 01:34) 1101b of an audio source being played and volume information (for example, Vol. 6) 1101a of the sound source being played can be displayed on a boundary region of the touch screen 151 in a six o'clock and seven o'clock position.

In this instance, the controller 180 can link a first function performed according to the foregoing second touch input applied to the bezel portion 151a to text information displayed on the touch screen 151 corresponding to a position at which a touch input (i.e., the foregoing first touch input) is initially received on the bezel portion 151a.

For example, as illustrated in FIG. 11A, when a touch input 1121 is applied to the bezel portion 151a at a position corresponding to a region displayed with the volume information 1101a of the audio source, the controller 180 can display a progress bar 1111 for adjusting a volume on a boundary region of the touch screen 151 facing the touched position 1121, namely, on a boundary region in a 1-2 o'clock direction. In this instance, an indicator, for example, a box border image, indicating that the volume information 1101a is selected can be displayed.

Next, when a drag input 1131a in a right direction is applied to the bezel portion 151a at a position corresponding to the progress bar 1111, the controller 180 can extend the progress bar 1111 in length in the right direction (1111") to increase the volume of the audio source being played. "Further, the controller 180 can display status information that changes according to the execution of the volume adjustment function in one region of the touch screen 151. Accordingly, the adjusted volume information (for example, Vol. 8) 1112 or 1113 can appear and then disappear at the center of the screen 1101.

In addition, when a drag input 1131b in a left direction is applied to the bezel portion 151a at a position corresponding to the progress bar 1111 when a touch input 1121 applied to the bezel portion 151a is fixed, the controller 180 can reduce the progress bar 1111 in length in the left direction to decrease the volume of the audio source being played. Further, the adjusted volume information (for example, Vol. 3) 1112 can appear then disappear at the center of the screen 1101.

Also, as illustrated in FIG. 11B, when a touch input 1121 is applied to the bezel portion 151a at a position corresponding to a region displayed with the time information 1101b of the audio source, the controller 180 can display a box border image on the time information 1101b, and display a progress bar 1111 for adjusting a play time on a boundary region of the touch screen 151 facing the touched position 1121, namely, on a boundary region in a 12 o'clock direction.

In this instance, similarly to the foregoing description, when a drag input 1132a in a left direction is applied to the bezel portion 151a corresponding to the progress bar 1111, the controller 180 can move the progress bar 1111 in length in the left direction, and rewind the audio source being played by the dragged length (for example, 01:00). On the contrary, when a drag input 1132b for moving the progress bar 1111 in a right direction is applied to the bezel portion 151a, the controller 180 can extend the progress bar 1111 in length in the right direction (1111"), and fast forward the audio source being played by the dragged length (for example, 02:17).

In addition, the changed status information (for example, "◁<" or ">▷") 1114 or 1115 can appear and disappear at the center of the screen 1101. Furthermore, the controller 180 can reflect and display the changed status information on the time information 1101b in real time while receiving the drag input.

Next, referring to FIG. 11C, when a plurality of touch positions 1123 and 1133 applied to the bezel portion 151a are rotationally moved in one direction (for example, a counter clockwise direction) when the screen 1101 indicating audio source information being played is displayed on the touch screen 151 and a specific object, singer information (A), displayed on the screen 1101 is touched, the controller 180 can move the audio source currently being played to a next/previous audio source stored as the same singer information (A). Further, the controller 180 can determine a moving speed to the next/previous audio source in proportion to the extent of rotating the touch positions 1123 and 1133. When at least one of the touch positions 1123" and 1133" is released, the controller 180 can automatically move the relevant sound source.

Figure 12:
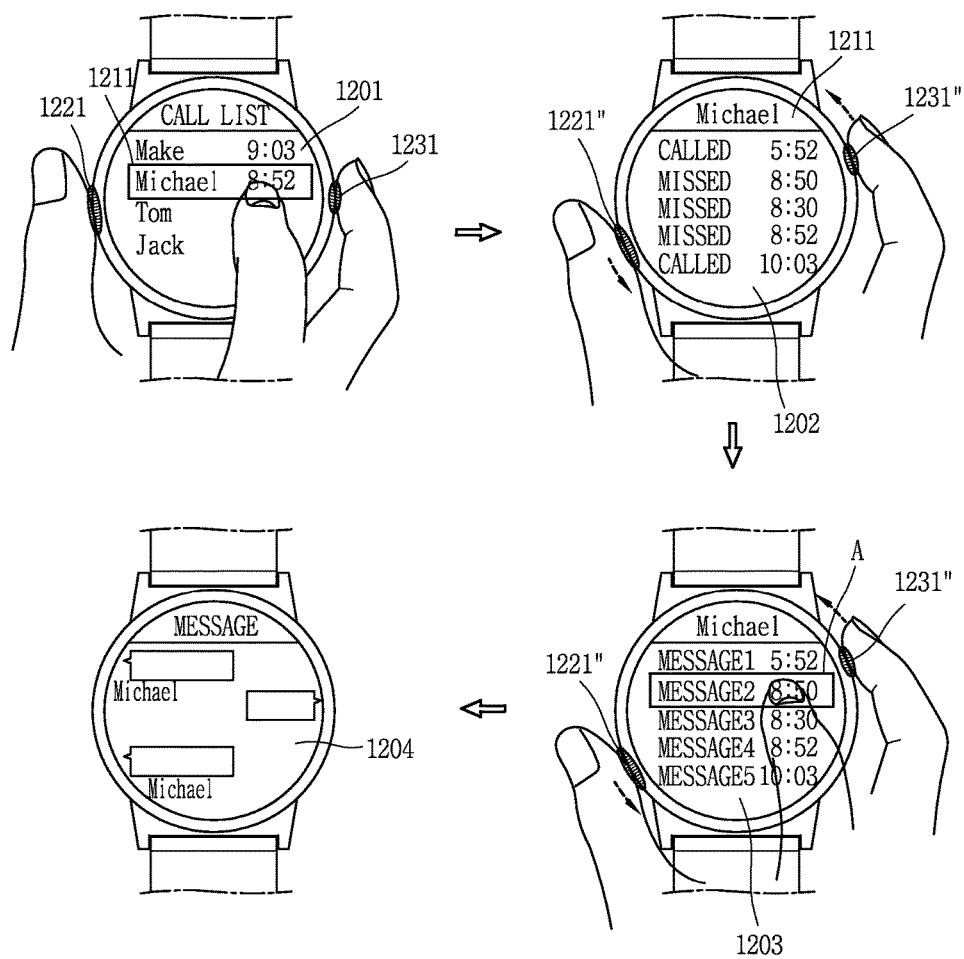
FIGS. 12 through 14 are views illustrating a method of scrolling contents associated with an object selected using a touch input to the bezel portion and touch screen in a watch-type terminal according to an embodiment of the present disclosure.
Figure 13:
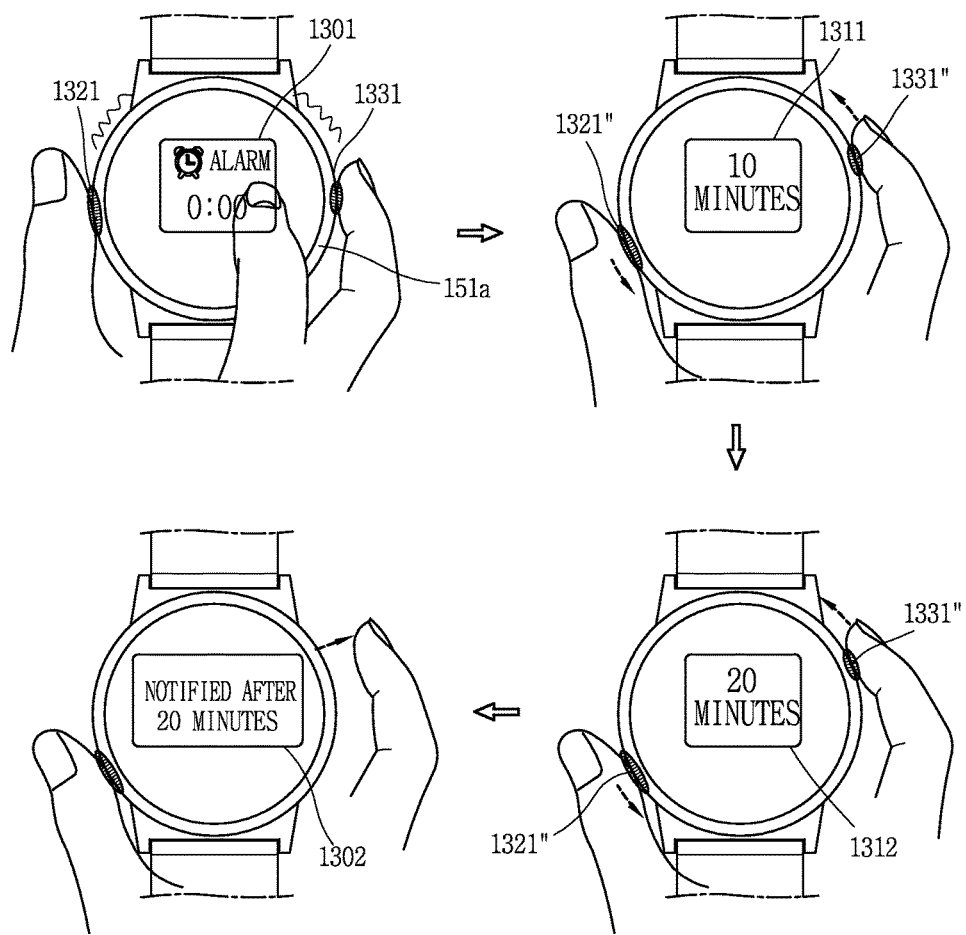
Figure 14:
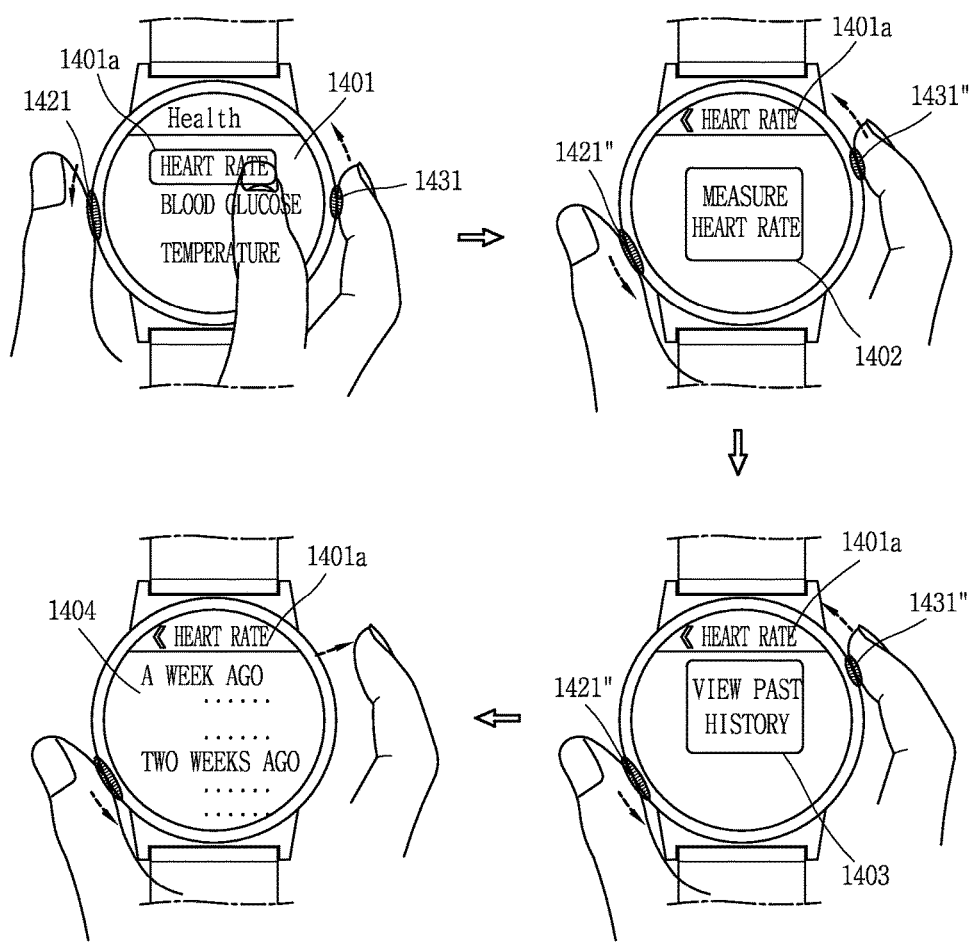

Hereinafter, FIGS. 12 through 14 are various embodiments illustrating a method of quickly scrolling contents associated with an object selected using a touch input to the bezel portion and touch screen in a watch-type terminal according to an embodiment of the present disclosure. In particular, FIG. 12 illustrates a method of extending a search range associated with a specific person using a touch input to the bezel portion 151a.

Referring to FIG. 12, when a call list 1201 is displayed on the touch screen 151 and the touch positions 1221 and 1231 applied to the bezel portion 151a are rotationally moved in one direction (for example, counter clockwise direction) when a specific person 1211 is selected by a touch (1221" and 1231"), the controller 180 can scroll the other information, for example, call information, SNS, messages, emails and the like, transmitted to and received from the selected specific person in a time sequence (1202 and 1203).

In other words, the controller 180 can extend a search range of the specific person 1211 to another application. Further, when a touch area corresponding to the touch positions 1221 and 1231 is increased, the other information transmitted to and received from the selected specific person is more quickly scrolled. When a touch is applied to another desired information, for example, specific message information (A), screen information 1204 containing the relevant message information is displayed.

Further, when a touch positions applied to the bezel portion 151a are rotationally moved in one direction (for example, a counter clockwise direction) when the specific person 1211 is not selected, the controller 180 can limit the scroll range to a call list, and control the call list 1201 to be scrolled in proportion to a touch area corresponding to the touch positions.

Next, FIG. 13 illustrates a method of controlling a snooze function of alarm using a touch input. Referring to FIG. 13, when preset alarm information 1301 is displayed on the touch screen 151 along with vibration, and when a touch applied to the alarm information 1301 is maintained and a touch positions 1321 and 1331 applied to the bezel portion 151a are rotationally moved (for example, a counter clockwise direction) as shown by touch positions 1321" and 1331", the controller 180 can set a snooze function to a time in proportion to the rotated extent.

In other words, the corresponding time information (for example, "10 minutes", "20 minutes") 1311 and 1312 are sequentially displayed at the center of the touch screen 151. Next, when at least one of the touch positions 1321 and 1331 is released, the controller 180 can set the snooze function to time information displayed at the relevant time point, and display information 1302 indicating that the snooze function has been set on the touch screen 151.

Next, FIG. 14 illustrates a method of managing health care information using a touch input to the bezel portion 151a. Referring to FIG. 14, when an execution screen 1401 of a health care application is displayed on the touch screen 151 and a touch positions 1421 and 1431 applied to the bezel portion 151a are rotationally moved in one direction when a desired item (for example, "heart rate") 1401a is touched (1421" and 1431"), executable health care functions (for example, "measure heart rate:", "view past history") 1402 and 1403 associated with the selected item 1401a are quickly scrolled in sequence. Next, when at least one of the touch positions 1421 and 1431 is released, the controller 180 can display an entry screen 1404 of the displayed health care function at the relevant time point.

Further, the foregoing touch input for rotationally moving touch positions applied to the bezel portion 151a can be replaced with an embodiment of mechanically rotating the bezel portion 151a. Thus, at least one of a front bezel portion and a rear bezel portion of the bezel portion 151a can be implemented to be rotated in a preset direction or bidirectional manner.

Also, when the bezel portion 151a is rotated in one direction as described above, an image indicating the corresponding rotational direction and extent can be displayed on an edge region of the touch screen. For example, when the bezel portion 151a is rotated by 30 degrees in a clockwise direction, a bar-type changing image having a length corresponding to 30 degrees can be also displayed on an edge region of the touch screen 151. According to an embodiment, the shape (for example, appearance or color) of an image can vary when the rotational direction of the bezel portion 151a is changed.

Figure 15:
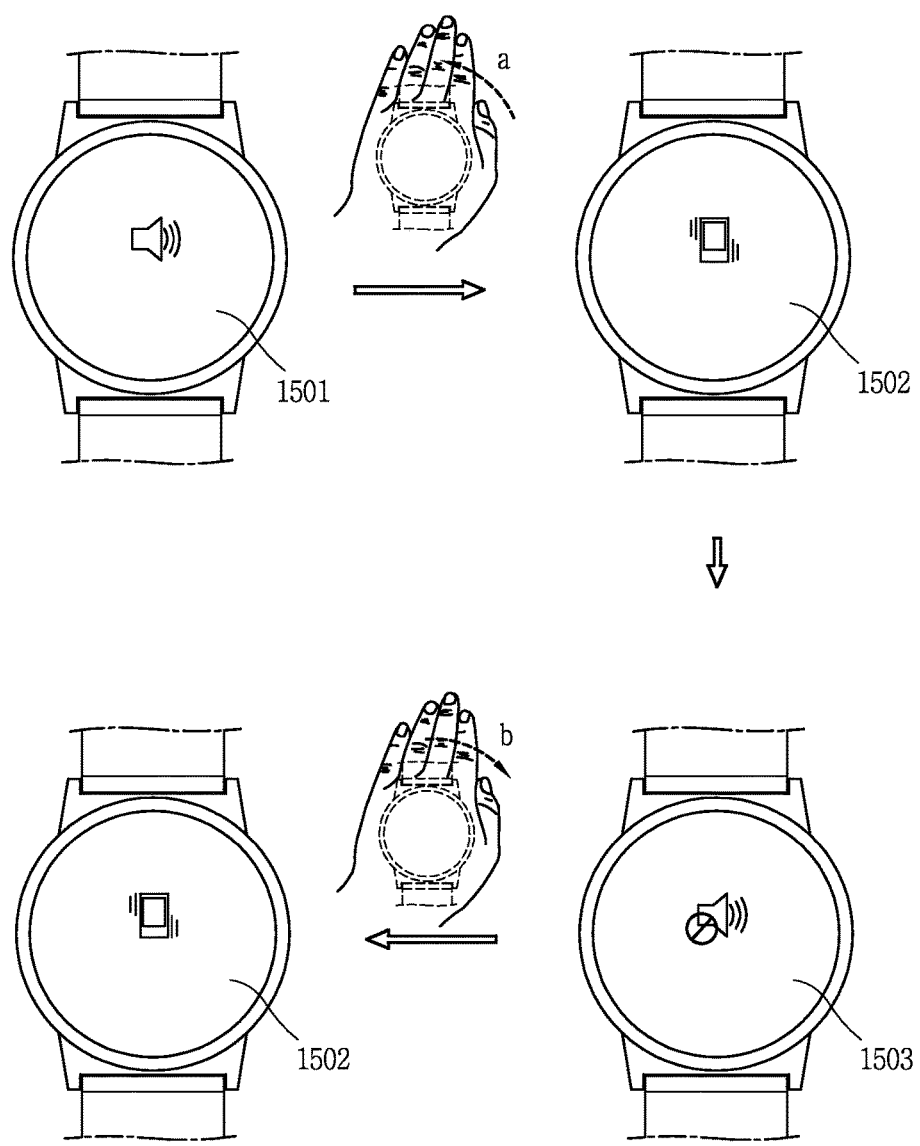
FIG. 15 is a view illustrating a method of quickly changing the operation mode of a watch-type terminal using a touch input to the touch screen in the watch-type terminal according to an embodiment of the present disclosure.

Hereinafter, FIG. 15 is a view illustrating a method of quickly changing the operation mode of a watch-type terminal using a touch gesture to the touch screen in the watch-type terminal according to an embodiment of the present disclosure. Referring to FIG. 15, when the operation mode of the watch-type terminal 100 is set to a sound mode, the controller 180 can control the set operation mode to vary when a gesture input rotated in one direction with respect to a front surface of the touch screen 151 is covered by a touch object (for example, hand or object).

In addition, the controller 180 can control the change extent of a preset operation mode to vary according to the rotational direction and extent of a gesture input rotated in one direction when a front surface of the touch screen 151 is covered. For example, when a front surface of the touch screen 151 is rotated by a predetermined angle (for example, 30-45 degrees) in a counter clockwise direction when a front surface of the touch screen 151 is covered by a touch object (for example, palm) in FIG. 15, a sound mode is switched to a vibration mode and displayed on the screen (1501 and 1502).

When the touch object is further rotated in a counter clockwise direction in this state (for example, more than 90 degrees), the vibration mode is switched to a mute mode and displayed on the screen (1502 and 1503). Meanwhile, when the touch object is further rotated in a direction opposite to the above, namely, in a counter clockwise direction, when a front surface of the touch screen 151 is covered by a touch object (for example, palm), the mute mode is switched again to the vibration mode and displayed on the screen (1502).

As described above, according to a watch-type terminal according to the embodiments of the present disclosure, a screen can be controlled using a touch input to the bezel portion surrounding a periphery of the display, thereby minimizing screen hiding due to the touch input while maintaining an intuitive input scheme. Furthermore, a touch area applied to the bezel portion may be varied or touch inputs in parallel may be applied to the bezel portion and the display, thereby quickly searching desired information.

The foregoing present disclosure may be implemented as codes readable by a computer on a medium written by the program. The computer-readable media includes all types of recording devices in which data readable by a computer system can be stored. Examples of the computer-readable media may include HDD (Hard Disk Drive), SSD (Solid State Disk), SDD (Silicon Disk Drive), ROM, RAM, CD-ROM, a magnetic tape, a floppy disk, an optical data storage device, and the like, and also include a device implemented via a carrier wave (for example, transmission via the Internet).

Furthermore, the computer may include the controller 180 of the mobile terminal. The detailed description is, therefore, not to be construed as restrictive in all respects but considered as illustrative. The scope of the invention should be determined by reasonable interpretation of the appended claims and all changes that come within the equivalent scope of the invention are included in the scope of the invention.

What is claimed is:

1. A watch-type terminal, comprising:
 a touch screen configured to display screen information;
 a bezel portion surrounding a periphery of the touch screen and configured to receive a touch input; and
 a controller configured to:
 display an image object indicating a status associated with the displayed screen information in one region of the touch screen in response to a first touch input received at a first part of the bezel portion,
 apply a first function to the screen information in response to a second touch input received at a second part of the bezel portion while the first touch input is maintained at the first part of the bezel portion, and
 apply a second function different from the first function to the screen information in response to a touch area corresponding to the first touch input being changed,
 wherein the controller is further configured to:
 scroll the screen information in response to the first and second touch inputs rotationally moving in one direction,
 change a scroll unit or speed of scrolling the screen information based on a size of touch areas of the first and second touch inputs,
 receive a third touch input on an object included in the displayed screen information while applying the first and second touch inputs, and
 scroll the screen information excluding the touched object in response to the first and second touch inputs being rotationally moved in the one direction.

2. The watch-type terminal of claim 1, wherein the controller is further configured to display the image object on a boundary region of the touch screen facing a position at which the first touch input is initially received.

3. The watch-type terminal of claim 1, wherein the image object is a progress bar displayed along a boundary region of the touch screen.

4. The watch-type terminal of claim 1, wherein the controller is further configured to display an icon for applying the second function on the touch screen in response to the touch area corresponding to the first touch input being changed.

5. The watch-type terminal of claim 4, wherein the controller is further configured to apply a function of the icon to the screen information in response the first touch input being maintained and a touch selecting the icon being received.

6. The watch-type terminal of claim 1, wherein the controller is further configured to:
 control a scroll extent of the screen information except the touched object based on a rotational movement extent of the first and second touch inputs, and
 control a scroll unit or speed of the screen information except the touched object to vary when a touch area corresponding to the first and second touch inputs changing.

7. The watch-type terminal of claim 1, wherein the controller is further configured to:
 display the touched object as a pop-up window while the first and second touch inputs are rotationally moved in one direction, and
 maintain the display of the pop-up window even when the third touch input applied to the object is released.

8. The watch-type terminal of claim 7, wherein the controller is further configured to stop scrolling the screen information and enter an operation mode for comparing the touched object with at least one content included in the displayed screen information when any one of the first and second touch inputs is released.

9. The watch-type terminal of claim 8, wherein the controller is further configured to display at least one of the other contents in comparison with the object included in the pop-up window in response to the other touch input being rotationally moved.

10. The watch-type terminal of claim 1, wherein the controller is further configured to:
 reconfigure a list of content included the displayed screen information according to a distance between the first and second touch inputs on the bezel portion.

11. The watch-type terminal of claim 10, wherein the controller is further configured to:
 reconfigure the list of content in a first configuration in response to the first and second touch inputs being a first predetermined reference distance, and
 reconfigure the list of content in a second configuration in response to the first and second touch inputs being a second predetermined reference distance.

12. The watch-type terminal of claim 10, wherein the controller is further configured to:
 display a first graphic object indicating a status of the displayed screen information on the touch screen at a boundary position corresponding to first touch input at the bezel portion,
 display a second graphic object for changing a status of the displayed screen information on the touch screen at a boundary position corresponding to the second touch input, and
 change the status of the displayed screen information in response to the rotational movement of the second touch input.

13. The watch-type terminal of claim 10, wherein the controller is further configured to scroll the reconfigured list in response to any one of first and second touch inputs being dragged in one direction when the other one thereof is fixed.

14. The watch-type terminal of claim 1, wherein the controller is further configured to display a graphic object on the touch screen indicating how the screen information is changed.

15. The watch-type terminal of claim 1, wherein the controller is further configured to change an operation mode of the mobile terminal in response to a gesture input being rotated in one direction on a front surface of the touch screen.

16. The watch-type terminal of claim 15, wherein the controller is further configured to change the operation mode to another operational mode based on a rotational direction and extent of the gesture.

17. The watch-type terminal of claim 1, wherein the controller is configured to display the touched object in a larger scale than the other contents while scrolling the screen information excluding the touched object.

18. A method of controlling a watch-type terminal, the method comprising:
   displaying, via a touch screen of the mobile terminal, screen information;
   displaying, via the touch screen, an image object indicating a status associated with the displayed screen information in one region of the touch screen in response to a first touch input received at a first part of a bezel portion of the mobile terminal;
   applying, via a controller of the mobile terminal, a first function to the screen information in response to a second touch input received at a second part of the bezel portion while the first touch input is maintained at the first part of the bezel portion; and
   applying, via the controller, a second function different from the first function to the screen information in response to a touch area corresponding to the first touch input being changed,
   wherein the method further comprises:
   scrolling the screen information in response to the first and second touch inputs rotationally moving in one direction;
   changing a scroll unit or speed of scrolling the screen information based on a size of touch areas of the first and second touch inputs;
   receiving a third touch input on an object included in the displayed screen information while applying the first and second touch inputs; and
   scrolling the screen information excluding the touched object in response to the first and second touch inputs being rotationally moved in the one direction.

19. The method of claim 18, further comprising displaying the touched object in a larger scale than the other contents while scrolling the screen information excluding the touched object.

* * * * *